US011482768B2

(12) United States Patent
Liu

(10) Patent No.: US 11,482,768 B2
(45) Date of Patent: Oct. 25, 2022

(54) CUSTOMER PREMISE EQUIPMENT, METHOD FOR ANTENNA CONTROL, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Chang Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 149 days.

(21) Appl. No.: 17/104,620

(22) Filed: Nov. 25, 2020

(65) Prior Publication Data

US 2021/0226315 A1    Jul. 22, 2021

(30) Foreign Application Priority Data

Jan. 21, 2020 (CN) .......................... 202010070757.3

(51) Int. Cl.
*H01Q 3/04* (2006.01)
*H01Q 1/12* (2006.01)
(Continued)

(52) U.S. Cl.
CPC ............ *H01Q 1/125* (2013.01); *H01Q 1/246* (2013.01); *H01Q 3/04* (2013.01); *H04W 24/10* (2013.01)

(58) Field of Classification Search
CPC ........ H01Q 3/04; H04W 24/02; H04W 24/10; H04W 84/12; H04B 7/0404; H04B 7/0617
See application file for complete search history.

(56) References Cited

U.S. PATENT DOCUMENTS 9,952,307 B2    4/2018  Gan
2003/0232595 A1  12/2003  Baker et al.
(Continued)

FOREIGN PATENT DOCUMENTS

CN       102122976      7/2011
CN       102565793      7/2012
(Continued)

OTHER PUBLICATIONS

SIPO, First Office Action for CN Application No. 202010070757.3, dated Feb. 7, 2021.
(Continued)

*Primary Examiner* — Daniel Munoz
(74) *Attorney, Agent, or Firm* — Hodgson Russ LLP

(57) ABSTRACT

A customer premise equipment (CPE), a method for antenna control, and a computer-readable storage medium are provided in an implementation of the present disclosure. The CPE includes a millimeter-wave antenna, a radio frequency (RF) circuit, a driving module, and a processor. The processor is configured to perform the following. Control the driving module to drive, according to an interval stepping strategy, the millimeter-wave antenna to rotate to perform interval scan on multiple blocks, and correspondingly obtain network information measured in each of the blocks to obtain multiple pieces of network information measured. Determine a target block for the millimeter-wave antenna according to the multiple pieces of network information measured. Control, in the target block, the driving module to drive, according to a preset rotation stepping, the millimeter-wave antenna to rotate to obtain a target orientation. Control the millimeter-wave antenna to rotate to the target orientation.

20 Claims, 12 Drawing Sheets

(51) Int. Cl.
*H01Q 1/24* (2006.01)
*H04W 24/10* (2009.01)

(56) References Cited

U.S. PATENT DOCUMENTS

| | | | |
|---|---|---|---|
| 2010/0177655 | A1 | 7/2010 | Duenyas |
| 2011/0105049 | A1 | 5/2011 | Kamada et al. |
| 2011/0300850 | A1 | 12/2011 | Kuo et al. |
| 2013/0237294 | A1 | 9/2013 | Periyalwar et al. |
| 2013/0315076 | A1 | 11/2013 | Zhao et al. |
| 2015/0256213 | A1 | 9/2015 | Jan et al. |
| 2016/0381570 | A1 | 12/2016 | Lysejko et al. |
| 2019/0386399 | A1 | 12/2019 | You et al. |
| 2020/0204240 | A1 | 6/2020 | Ryu et al. |
| 2021/0226315 | A1 | 7/2021 | Liu |
| 2021/0226330 | A1 | 7/2021 | Zhou et al. |
| 2021/0226333 | A1 | 7/2021 | Liu |
| 2021/0227400 | A1* | 7/2021 | Jia .................. H04W 16/28 |
| 2021/0234598 | A1* | 7/2021 | Raghavan ........... H04B 7/0695 |

FOREIGN PATENT DOCUMENTS

| | | |
|---|---|---|
| CN | 102594376 | 7/2012 |
| CN | 102883006 | 1/2013 |
| CN | 103079268 | 5/2013 |
| CN | 203433115 | 2/2014 |
| CN | 103887613 | 6/2014 |
| CN | 105323075 | 2/2016 |
| CN | 105491190 | 4/2016 |
| CN | 105659667 | 6/2016 |
| CN | 106160887 | 11/2016 |
| CN | 106712800 | 5/2017 |
| CN | 106792774 | 5/2017 |
| CN | 107682039 | 2/2018 |
| CN | 108390734 | 8/2018 |
| CN | 108988903 | 12/2018 |
| CN | 208190649 | 12/2018 |
| CN | 109302245 | 2/2019 |
| CN | 109428177 | 3/2019 |
| CN | 109495911 | 3/2019 |
| CN | 208581234 | 3/2019 |
| CN | 109904626 | 6/2019 |
| CN | 209184819 | 7/2019 |
| CN | 111277294 | 6/2020 |
| CN | 111277309 | 6/2020 |
| EP | 2685638 | 1/2014 |
| EP | 2722722 | 4/2014 |
| EP | 3599724 | 1/2020 |
| WO | 2019016593 | 1/2019 |

OTHER PUBLICATIONS

SIPO, First Office Action for CN Application No. 202010072643.2, dated Mar. 8, 2021.
WIPO, International Search Report for PCT/CN2020/132323, dated Feb. 25, 2021.
WIPO, International Search Report for PCT/CN2020/131815, dated Feb. 25, 2021.
WIPO, International Search Report for PCT/CN2021/071747, dated Apr. 12, 2021.
USPTO, Notice of Allowance for U.S. Appl. No. 17/107,924, filed Mar. 23, 2022.
CNIPA, Notice of Grant of Patent Right for Invention for CN Application No. 202010072643.2, dated Jul. 27, 2021.
EPO, Extended European Search Report for EP Application No. 20210823.9, dated Aug. 9, 2021.
EPO, Partial European Search Report for EP Application No. 20210823.9, dated May 7, 2021.
EPO, Extended European Search Report for EP Application No. 20210687.8, dated Apr. 30, 2021.

* cited by examiner

CUSTOMER PREMISE EQUIPMENT, METHOD FOR ANTENNA CONTROL, AND COMPUTER-READABLE STORAGE MEDIUM

CROSS-REFERENCE TO RELATED APPLICATION(S)

The present disclosure claims priority to Chinese Patent Application No. 202010070757.3, filed Jan. 21, 2020, the entire disclosure of which is incorporated by reference herein.

TECHNICAL FIELD

This disclosure relates to the technical field of wireless communication, and in particular, to a customer premise equipment (CPE), a method for antenna control, and a computer-readable storage medium.

BACKGROUND

With the development of wireless communication technology, network technology is also updated. For example, a fifth generation (5G) network was born, and theoretically, a peak transmission speed of the 5G network can reach 10 Gb/s or more, which is hundreds of times higher than a transmission speed of a fourth generation (4G) network. Therefore, a millimeter-wave frequency band with sufficient spectrum resources has become one of operating frequency bands of a network system (for example, a 5G communication system or a future public land mobile network (PLMN) system evolved after the 5G communication system).

Generally, a millimeter-wave antenna can be fixed in a CPE that is used for communication. The millimeter-wave antenna generally includes multiple antenna modules. The antenna modules are respectively fixed in different positions of the CPE, such that radiation directions of the antenna modules are different, and thus an alignment between the CPE and a base station can be improved. However, setting multiple antenna modules may result in high cost.

SUMMARY

Implementations of the present disclosure provides a CPE, a method for antenna control, and a computer-readable storage medium.

A CPE includes a millimeter-wave antenna, a radio frequency (RF) circuit, a driving module, and a processor. The millimeter-wave antenna is configured to receive and transmit an antenna signal at a millimeter-wave frequency band. The RF circuit is coupled with the millimeter-wave antenna, configured to control the millimeter-wave antenna to receive and transmit the antenna signal, and measure network information of the antenna signal. The driving module is coupled with the millimeter-wave antenna and configured to drive the millimeter-wave antenna to rotate. The processor is in communication with the RF circuit and the driving module and configured to perform following. According to an interval stepping strategy, control the driving module to drive the millimeter-wave antenna to rotate to perform interval scan on multiple blocks, and correspondingly obtain network information measured in each of the blocks by the RF circuit to obtain multiple pieces of network information measured, where the blocks are determined according to a scan range of the millimeter-wave antenna. Determine a target block for the millimeter-wave antenna according to the multiple pieces of network information measured. Control, in the target block, the driving module to drive, according to a preset rotation stepping, the millimeter-wave antenna to rotate to obtain a target orientation. Control the millimeter-wave antenna to rotate to the target orientation.

A method for antenna control is provided. The method is applied to a CPE. The CPE includes a millimeter-wave antenna, an RF circuit, and a driving module. The millimeter-wave antenna is configured to transmit and receive an antenna signal at a millimeter-wave frequency band. The RF circuit is coupled with the millimeter-wave antenna, configured to drive the millimeter-wave antenna to transmit and receive the antenna signal, and measure network information of the antenna signal. The driving module is coupled with the millimeter-wave antenna and configured to drive the millimeter-wave antenna to rotate. The method includes following. According to an interval stepping strategy, control the driving module to drive the millimeter-wave antenna to rotate to perform interval scan on multiple blocks, and correspondingly obtain network information measured in each of the multiple blocks by the RF circuit to obtain multiple pieces of network information measured, where the blocks are determined according to a scan range of the millimeter-wave antenna. Determine a target block for the millimeter-wave antenna according to the multiple pieces of network information measured, where at least one target block is determined. Control, in the target block, the driving module to drive, according to a preset rotation stepping, the millimeter-wave antenna to rotate to obtain a target orientation. Control the millimeter-wave antenna to rotate to the target orientation.

A CPE includes a memory and a processor. The memory stores computer programs, where the computer programs, when executed by the processor, are operable with the processor to perform following. According to an interval stepping strategy, control a driving module of the CPE to drive a millimeter-wave antenna of the CPE to rotate to perform interval scan on multiple blocks, and correspondingly obtain network information measured in each of the blocks by the RF circuit to obtain multiple pieces of network information measured, where the blocks are determined according to a scan range of the millimeter-wave antenna. Determine a target block for the millimeter-wave antenna according to the multiple pieces of network information measured, where at least one target block is determined. Control, in the target block, the driving module to drive, according to a preset rotation stepping, the millimeter-wave antenna to rotate to obtain a target orientation. Control the millimeter-wave antenna to rotate to the target orientation

BRIEF DESCRIPTION OF THE DRAWINGS

To describe technical solutions in implementations of the present disclosure or related art more clearly, the following will briefly introduce the accompanying drawings required for describing the implementations or related art. Apparently, the accompanying drawings in the following description merely illustrate some implementations of the present disclosure. Those of ordinary skill in the art may also obtain other accompanying drawings based on these accompanying drawings without creative efforts.

DETAILED DESCRIPTION

In order to make the purpose, technical solutions, and advantages of the present disclosure clear, the following will describe the present disclosure in detail with reference to the accompanying drawings and implementations. It should be understood that the implementations described herein are only used to explain the present disclosure and not used to limit the present disclosure.

The expression "configured to" used in the present disclosure can be used interchangeably with, for example, "suitable", "capable of", "able to", or "designed" in hardware or software manner according to situations. In some cases, the expression "a device configured to . . . " may imply that the device can perform an operation with other devices or components. For example, the expression "a processor configured to execute A, B, and C" may imply a processor for performing corresponding operations, which can perform corresponding operations by executing one or more software programs stored in a storage device.

Figure 1:
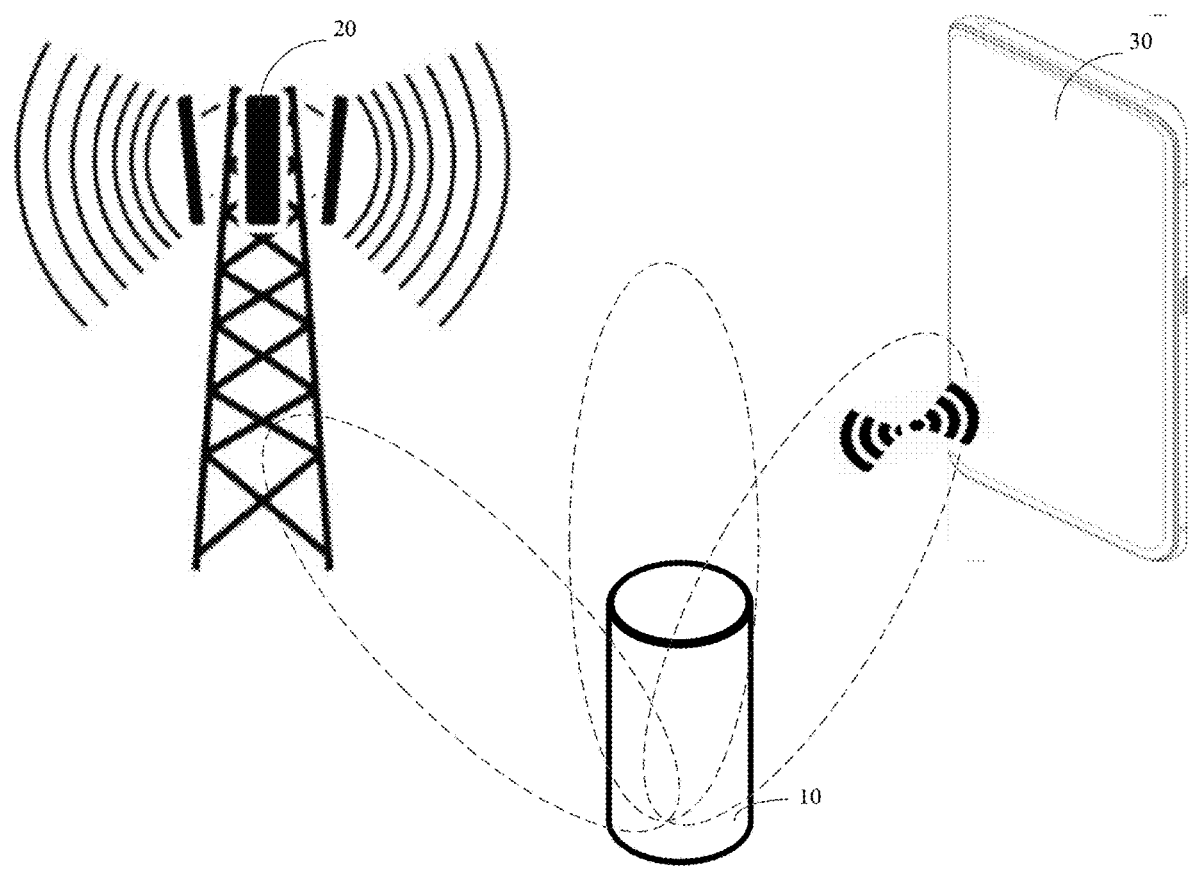
FIG. 1 is a schematic structural diagram illustrating a network system architecture according to an implementation.

FIG. 1 is a schematic structural diagram illustrating a network system architecture according to an implementation of the present disclosure. In the network system architecture illustrated in FIG. 1, a CPE 10 can be coupled with a first base station 20 in a first network system and connect to a core network via the first base station 20. The CPE 10 is configured to realize a network access function and converts an operator's public network (i.e., wide area network, WAN) into a user's home local area network (LAN), and with the CPE 10, multiple mobile terminals 30 can connect to a network simultaneously. In addition, in the vicinity of the CPE 10, a cell where a second network system locates and a second base station may exist, or the cell where the second communication system locates and the second base station may not exist. The first network system is different from the second network system. For example, the first network system may be a 4G system, and the second network system may be a 5G system. For another example, the first network system may be the 5G system, and the second network system may be a future PLMN system evolved after the 5G system. In the implementation of the present disclosure, there is no detailed limitation on types of the first network system and the second network system.

When the CPE 10 is coupled to the 5G communication system, through a beam formed by a 5G millimeter-wave antenna, data transmission and reception can be performed between the CPE 10 and a corresponding base station, where the beam needs to be aligned with an antenna beam from the base station, such that the CPE 10 can transmit uplink data to the base station or receive downlink data from the base station.

Figure 2:
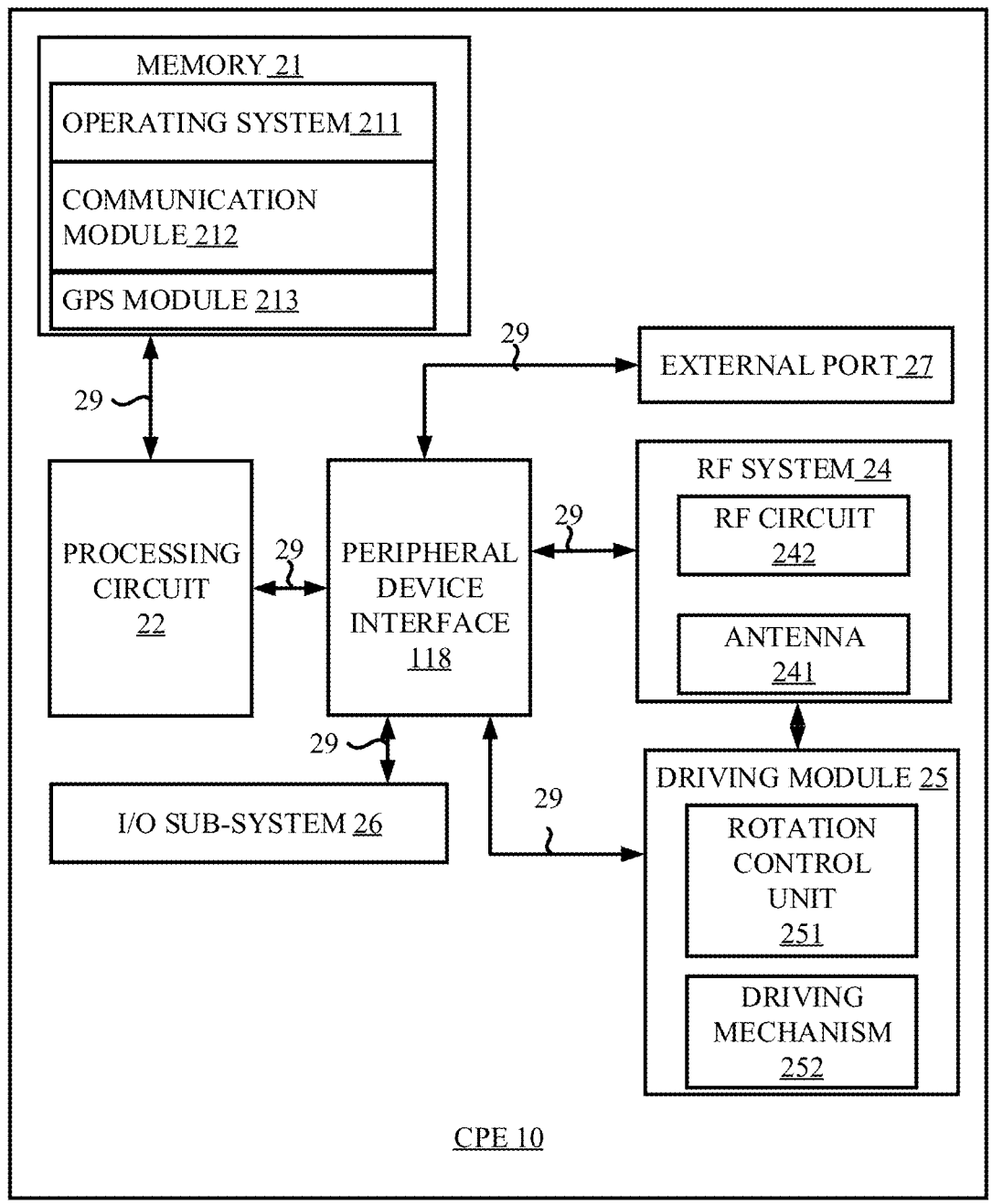
FIG. 2 is a schematic structural diagram illustrating internal structures of a CPE according to an implementation.

The CPE 10 is used to realize the network access function and convert the operator's public network (i.e., WAN) into the user's home LAN. According to current Internet broadband access manners, there may be fiber access (fiber to the home, FTTH), digital subscriber line (DSL) access, cable access (cable TV line access), and mobile access (i.e., wireless CPE). The CPE is a mobile signal access device that receives mobile signals and converts the mobile signals into wireless fidelity (Wi-Fi) signals, and can also convert high-speed 4G or 5G signals into Wi-Fi signals. With the CPE 10, multiple mobile terminals 30 can connect to a network simultaneously. FIG. 2 illustrates a CPE according to an implementation of the present application. The CPE 10 includes a memory 21 (including one or more computer-readable storage mediums), a processor 22, a peripheral device interface 23, a radio frequency (RF) system 24, a driving module 25, an Input/Output (I/O) sub-system 26, and an external port 27. These components may communicate with each other via one or more communication buses or signal lines 29. Those skilled in the art can understand that the CPE illustrated in FIG. 2 does not constitute a limitation on the CPE, and the CPE may include more or less components than that illustrated in FIG. 2, or a combination of some components, or a different component arrangement. The various components illustrated in FIG. 2 are implemented by hardware, software, or a combination of hardware and software, and include one or more signal processing and/or application-specific integrated circuits.

The memory 21 may include a high-speed random access memory (RAM), and may also include a non-volatile memory, such as one or more disk storage devices, one or more flash memory devices, or other non-volatile solid-state memory devices. For example, software components stored in the memory 21 include an operating system 211, a communication module (or instruction set) 212, a global positioning system (GPS) module (or instruction set) 213, and the like.

The processor 22 and other control circuits (such as a control circuit in the RF system 24) may be used to control the operation of the CPE 10. The processor 22 may be based on one or more microprocessors, microcontrollers, digital signal processors, baseband processors, power management units, audio encoder-decoder chips, application-specific integrated circuits, and the like.

The processor 22 may be configured to implement a control algorithm that controls usage of an antenna in the CPE 10. For example, the processor 22 may be configured to control the driving module 25 to rotate a millimeter-wave antenna to a target orientation for transmitting and/or receiving signals.

The I/O sub-system 26 is configured to couple input/output peripheral devices in the CPE 10 such as a keypad and other input control devices to the peripheral device interface 118. The I/O sub-system 26 may include a touch screen, a button, a joystick, a touch pad, a keypad, a keyboard, a tone generator, an acceleration sensor (a motion sensor), an ambient light sensor and other sensors, a light-emitting diode and other status indicators, a data port, and so on. The user can input commands via the I/O sub-system 26 to control the operation of the CPE 10, and can obtain status information and other output from the CPE 10 by means of output resources of the I/O sub-system 26.

The external port 27 may be an Ethernet card, a wireless network card, or the like, and is configured to communicate with external electronic devices.

The RF system 24 includes an antenna 241, and the antenna 241 may be any suitable antenna. For example, the antenna 241 may include an antenna with resonant elements formed by at least one of following antenna structures: an array antenna structure, a loop antenna structure, a patch antenna structure, a slot antenna structure, a helical antenna structure, a strip shape antenna, a monopole antenna, a dipole antenna, and the like. Different types of antennas can be used at different frequency bands and frequency band combinations. The CPE 10 may include multiple antennas. For example, the CPE 10 may include one millimeter-wave antenna for transmitting and receiving signals at millimeter-wave frequency bands, multiple 5G antennas for transmitting and receiving signals at sub-6 GHz frequency bands, multiple 2G/3G/4G antennas for transmitting and receiving signals at 2G/3G/4G frequency bands, and the like. The antennas may be directional antennas or non-directional antennas, and may also be fixed or rotatable.

In an implementation, the millimeter-wave antenna may include a millimeter-wave antenna array (multiple radiation patches) and an RF transceiver chip. The millimeter-wave antenna array is configured to realize reception and transmission of millimeter-wave signals, and the millimeter-wave RF transceiver chip is configured to realize up and down frequency conversion processing of millimeter-wave signals. Further, the millimeter-wave antenna array and the RF transceiver chip can be disposed on a same printed circuit board (PCB) to reduce insertion loss during millimeter-wave signal transmission and improve performance of an RF index.

The RF system 24 may also include multiple RF circuits 242 for processing RF signals at different frequency bands. For example, the RF system 24 includes a satellite positioning RF circuit configured to receive satellite positioning signals at 1575 MHz, a Wi-Fi and Bluetooth transceiver RF circuit configured to process signals at 2.4 GHz and 5 GHz in IEEE802.11 communication, and a cellular phone transceiver RF circuit configured to process wireless communication at a cellular phone frequency band (such as 850 MHz, 900 MHz, 1800 MHz, 1900 MHz and 2100 MHz, other 5G millimeter wave, or the sub-6G frequency band).

Figure 3:
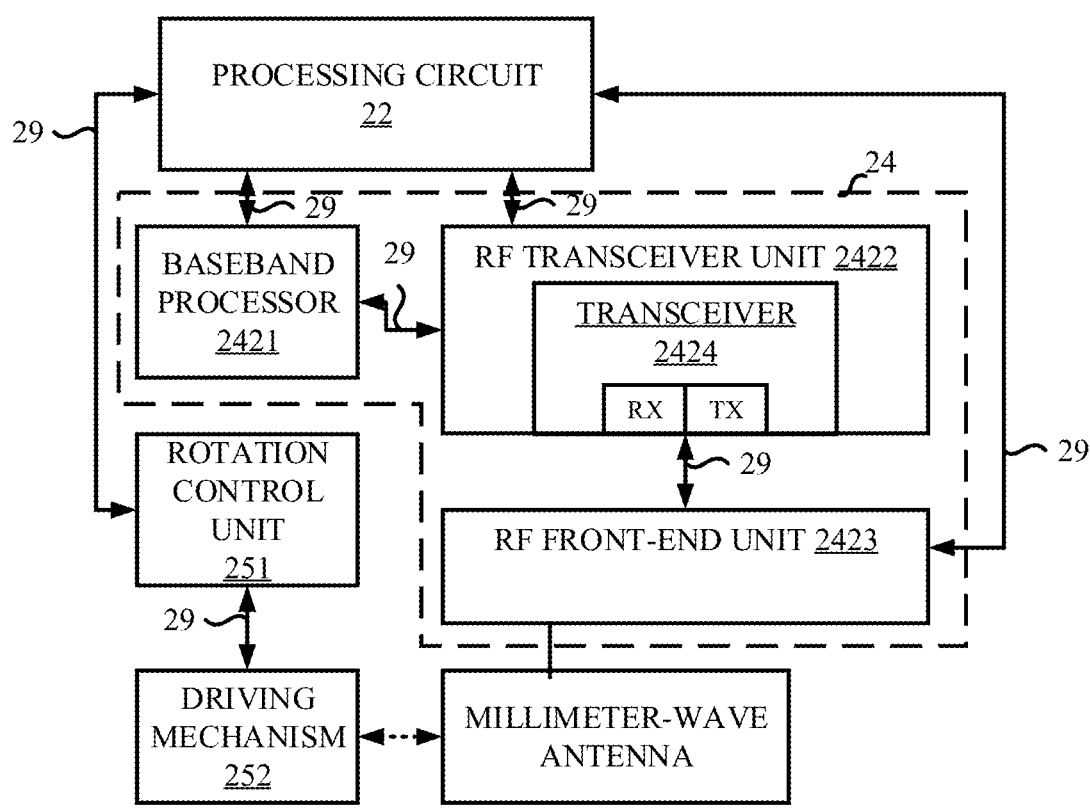
FIG. 3 is a schematic structural diagram illustrating internal structures of the CPE according to another implementation.

Referring to FIG. 3, for example, the RF circuit 242 may further include a baseband processor 2421, an RF transceiver unit 2422, and an RF front-end unit 2423. The baseband processor 2421 can provide network information to the processor 22. The network information may include original and processed information associated with wireless performance metrics of received antenna signals, such as received power, transmission power, reference signal receiving power (RSRP), reference signal receiving quality (RSRQ), a received signal strength indicator (RSSI), a signal to noise ratio (SNR), a rank of a multiple input multiple output (MIMO) channel matrix, a carrier to interference plus noise ratio (RS-CINR), a frame error rate, a bit error rate, channel quality measurement based on signal quality data (such as Ec/Io or c/No data), information indicative of whether a response corresponding to a request from a mobile terminal is being received from a base station, information indicative of whether network access is successful, and so on.

The processor 22 may analyze the received network information, and in response, the processor 22 (or, if necessary, the baseband processor 2421) may transmit a control command for controlling the RF system 24 or the driving module 25. For example, the processor 22 may transmit a control command for controlling the driving module 25 to drive the millimeter-wave antenna to rotate.

The RF transceiver unit 2422 may include one or more RF transceivers, such as a transceiver 2424 (for example, one or more transceivers shared between antennas, one transceiver for each antenna, etc.). In an implementation, the transceiver 2424 may include a transmitter (such as a transmitter TX) and a receiver (such as a receiver RX), or may only include the receiver (such as the receiver RX) or the transmitter (such as the transmitter TX). In an implementation, the transceiver can be configured to implement frequency conversion processing between an intermediate frequency signal and a baseband signal, or/and, to implement frequency conversion processing between the intermediate frequency signal and a high frequency signal, and so on.

The baseband processor 2421 can receive digital data from the processor 22, and can also use the RF transceiver unit 2422 to transmit corresponding antenna signals. The RF front-end unit 2423 may be coupled between the RF transceiver unit 2422 and the antenna 241, and can be configured to transmit RF signals generated by the transmitters 2424 and 2426 to the antenna 241. The RF front-end unit 2423 may include an RF switch, an impedance matching circuit, a filter, and other circuits for forming an interface between the antenna 241 and the RF transceiver unit 2422.

The driving module 25 may include a rotation control unit 251 (for example, a microprocessor, a microcontroller, or a corresponding control circuit) and a driving mechanism 252. The millimeter-wave antenna is installed in the driving mechanism 252. Under control of the rotation control unit 251, the millimeter-wave antenna is driven by the driving mechanism 252 to rotate. In an implementation, a rotation axis of the millimeter-wave antenna extends along a longitudinal direction of the CPE 10. During rotation of the millimeter-wave antenna around the rotation axis, after each rotation, an orientation of a radiation surface of the millimeter-wave antenna can be correspondingly changed, and thus a 360-degree rotation in a horizontal plane can be achieved to perform omnidirectional scan.

In an implementation, the radiation surface of the millimeter-wave antenna may be parallel to the rotation axis. The radiation surface of the millimeter-wave antenna may be referred to as a plane where the radiation patch of the millimeter-wave antenna locates.

Furthermore, the driving mechanism 252 includes a detection assembly. The detection assembly is configured to measure orientation information of rotation of the millimeter-wave antenna in a block. In an implementation, the detection assembly includes a magnet and a magnetic encoding chip. In an implementation of the present disclosure, rotation of the millimeter-wave antenna can drive the magnet to rotate, resulting in a change in a magnetic field. The magnetic encoding chip can accurately measure the change in the magnetic field caused by the rotation of the magnet, and then accurately record the orientation information of the millimeter-wave antenna, thereby forming closed-loop control.

After the millimeter-wave antenna makes a rotation along a circle and 360-degree network information is measured, with the rotation angle recorded by the magnetic encoding chip, the processor 22 can obtain the optimal orientation (target orientation) in which the millimeter-wave antenna receives a network signal, and transmits a corresponding control command to the rotation control unit 251, so as to control the driving mechanism 252 to drive the millimeter-wave antenna to rotate to the optimal block where the millimeter-wave antenna receives a network signal. In an implementation, an absolute zero point can be set by the magnetic encoding chip, and by means of taking the absolute zero point as an initial position, the rotation angle of the millimeter-wave antenna relative to the initial position is recorded. Of course, in other implementations, a relative-angle measurement method can also be used to record the rotation angle defined between the current position of the millimeter-wave antenna and the previous position of the millimeter-wave antenna. It should be noted that the orientation information can be expressed by a rotation angle.

In an implementation, the processor can control, according to an interval stepping strategy, the driving module to drive the millimeter-wave antenna to rotate to perform interval scan on multiple blocks, correspondingly obtain multiple pieces of network information measured in multiple blocks by the RF circuit 242, determine a target block for the millimeter-wave antenna according to the multiple pieces of network information measured, control, in the target block, the driving module to drive the millimeter-wave antenna to rotate according to a preset rotation stepping so as to obtain a target orientation, and control the millimeter-wave antenna to rotate to the target orientation.

In an implementation, a range scanned by rotation of the millimeter-wave antenna may be a 360-degree horizontal plane. That is, the driving mechanism 252 can drive the millimeter-wave antenna to make a 360-degree omnidirectional coverage rotation.

The processor may be configured to obtain a number of blocks according to the range scanned by rotation of the millimeter-wave antenna. A scan range corresponding to each block is the same, that is, an included angle A of the scan range corresponding to each block is also the same. The included angle A of the scan range corresponding to each block may be 180 degrees, 120 degrees, 90 degrees, 72 degrees, 60 degrees, 45 degrees, 30 degrees, 15 degrees, or other. According to the included angle A of the scan range corresponding to each block, the amount a of the blocks can be obtained correspondingly, where a=360/A. For example, when the included angle of the scan range corresponding to each block is 180 degrees, the amount of the blocks is 2, which means that omnidirectional coverage can be achieved by rotating twice; when the included angle of the scan range corresponding to each block is 120 degrees, the amount of the blocks is 3, which means that the omnidirectional coverage can be achieved by rotating thrice; when the included angle of the scan range corresponding to each block is 90 degrees, the amount of the blocks is 4, which means that the omnidirectional coverage can be achieved by rotating four times; when the included angle of the scan range corresponding to each block is 72 degrees, the amount of the blocks is 5, which means that the omnidirectional coverage can be achieved by rotating five times.

It should be noted that the specific value of the included angle of the scan range corresponding to each block is not further limited. In an implementation, the included angle of the scan range corresponding to each block is smaller than a preset included angle, where the preset included angle may be 120 degrees. That is, according to the omnidirectional coverage strategy, there are more than three blocks.

In an implementation, the included range of the scan range scanned by rotation of the millimeter-wave antenna may be $\Phi$, where $\Phi$<360 degrees. That is, the driving mechanism 252 can drive the millimeter-wave antenna to rotate to perform partial-orientation scan to achieve partial-coverage rotation. In an implementation, the processor may be configured to obtain a number of blocks according to the range scanned by the rotation of the millimeter-wave antenna, where the scan range corresponding to each block is the same, that is, the included angle A of the scan range corresponding to each block is also the same. According to the included angle A of the scan range corresponding to each block, the amount a of the blocks can be obtained correspondingly, where a=$\Phi$/A.

The processor can be configured to construct the interval stepping strategy based on the multiple blocks. In an implementation, the processor may be configured to obtain the scan range corresponding to each block, determine at least one stepping value according to the scan range corresponding to each block, and determine the interval stepping strategy according to the at least one stepping value.

In an implementation, the interval stepping strategy may be understood as that when stepping from the current block to the next block during rotation, instead of stepping in a clockwise or counterclockwise direction, an interval stepping rotation is performed. The interval stepping rotation may be understood to be a stepping rotation with one or more blocks between the current block and the previous block or a stepping rotation with one or more blocks between the current block and the next block.

The interval stepping strategy is used to control the driving mechanism 252 to drive the millimeter-wave antenna to perform the stepping rotation in the sequence of the first block-the second block-the third block- . . . -the $a^{th}$ block. The millimeter-wave antenna does not make a sequential stepping rotation in the clockwise or counterclockwise direction between the first block and the second block, but makes an interval rotation. That is, there is an interval between the first block and the second block. The interval between the first block and the second block is the stepping value. The current block is the $i^{th}$ block, the previous block may be the $i-1^{th}$ block, and the next block may be the $i+1^{th}$ block. For example, when the included angle of the scan range corresponding to each block is 72 degrees, the amount of the blocks is 5, and the blocks can be identified in the clockwise or counterclockwise direction, for example, the blocks can be identified as block 1, block 2, block 3, block 4, and block 5. Further, the stepping value can be determined according to the scan range corresponding to each block. The stepping value can be understood as the scan range between the current block and the previous block, where the stepping value is the scan range corresponding to at least one block.

Figure 4A:
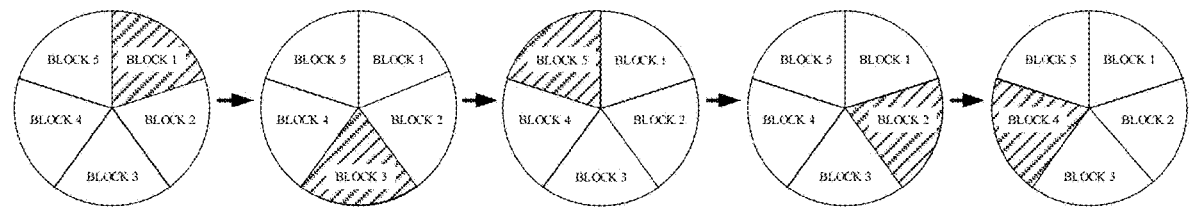
FIG. 4a is a stepping sequence diagram illustrating an interval stepping strategy according to an implementation.
Figure 4B:
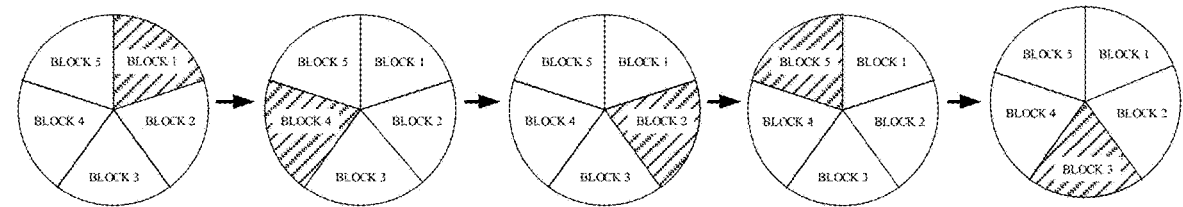
FIG. 4b is a stepping sequence diagram illustrating the interval stepping strategy in FIG. 4a according to another implementation.

Referring to FIGS. 4a and 4b, for example, when the stepping value is the scan range corresponding to one block, the interval stepping strategy determined according to the stepping value is that the millimeter-wave antenna is controlled to make a stepping rotation in the sequence of block 1-block 3-block 5-block 2-block 4 or in the sequence of block 1-block 4-block 2-block 5-block 3.

Figure 5A:
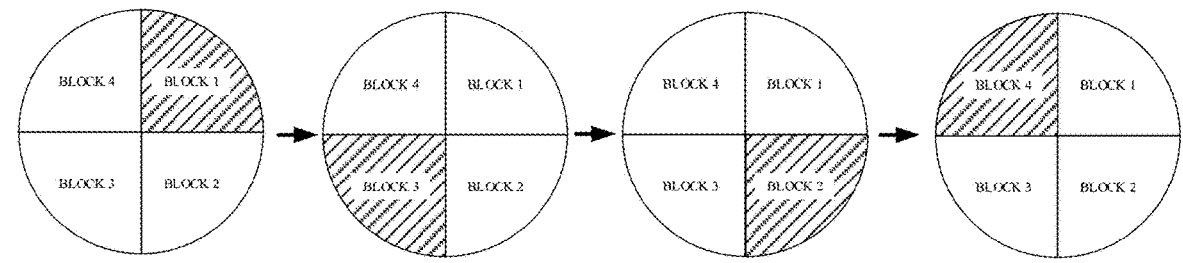
FIG. 5a is a stepping sequence diagram illustrating an interval stepping strategy according to yet another implementation.
Figure 5B:
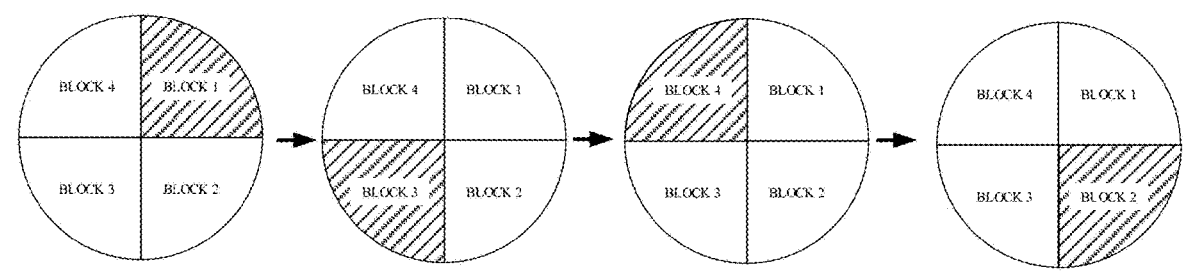
FIG. 5b is a stepping sequence diagram illustrating the interval stepping strategy in FIG. 5a according to another implementation.

Referring to FIGS. 5a and 5b, for example, when the included angel of the scan range corresponding to each block is 90 degrees, the amount of the blocks is 4, and the blocks can be identified in the clockwise or counterclockwise direction, for example, the blocks can be identified as blocks 1, 2, 3, 4. When the stepping value is the scan range corresponding to one block, the interval stepping strategy determined according to the stepping value is that the millimeter-wave antenna is controlled to make a stepping rotation in the sequence of block 1-block 3-block 2-block 4 or in the sequence of block 1-block 3-block 4-block 2.

Figure 6:
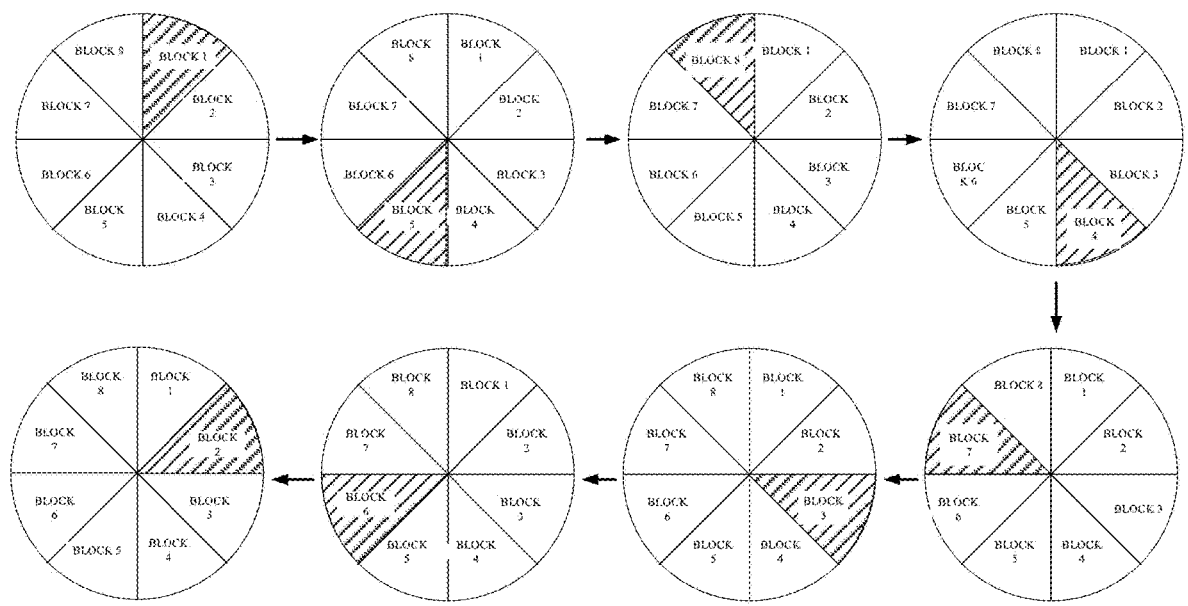
FIG. 6 is a stepping sequence diagram illustrating an interval stepping strategy according to another implementation.

Referring to FIG. 6, in an implementation, when the included angle of the scan range corresponding to each block is 45 degrees, the amount of the blocks is 8, and the blocks can be identified in the clockwise or counterclockwise direction, for example, the blocks can be identified as block 1, 2, 3, 4, 5, 6, 7, 8. At least one stepping value can be determined according to the scan range corresponding to each block. In this implementation, two stepping values are included, where one stepping value is a scan range corresponding to two blocks, and the other stepping value is a scan range corresponding to three blocks. The interval stepping strategy determined according to the stepping values is that the millimeter-wave antenna is controlled to make a stepping rotation in the sequence of block 1-block 5-block 8-block 4-block 7-block 3-block 6-block 2. It should be noted that block 1 can be taken as an initial block, where there is no any limitation on an initial position of block 1, and the initial position of block 1 may be any position of a 360-degree circumference. According to the omnidirectional coverage strategy, the 360-degree omnidirectional orientation can be divided into a blocks, and when stepping from the a–$2^{th}$ block to the a–$1^{th}$ block or the $a^{th}$ block, only sequential stepping rotation can be performed, and thus the millimeter-wave antenna is controlled to rotate in a sequential stepping manner.

Further, the stepping value can be set according to the scan range corresponding to each block and the amount a of the blocks. When stepping from the initial block to the next block relative to the initial block, the stepping value between the initial block and the next block may be a scan range corresponding to (a–1)/2–1 blocks or may be a scan range corresponding to a/2–1 blocks. For example, when the interval stepping strategy is that the millimeter-wave antenna is controlled to make a stepping rotation in the sequence of block 1-block 5-block 8-block 4-block 7-block 3-block 6-block 2, block 1 is the initial block, and block 5 is the next block relative to the initial block.

In an implementation, during rotation of the millimeter-wave antenna, the RF circuit can correspondingly measure the network information of the antenna signal received by the millimeter-wave antenna in each block. The processor may be configured to obtain, from the RF circuit, the network information of the antenna signal received by the millimeter-wave antenna in each block. For example, the antenna signal received by the millimeter-wave antenna is a millimeter-wave signal. During rotation of the millimeter-wave antenna, the RF circuit can correspondingly measure the network information of the millimeter-wave signal received by the millimeter-wave antenna in each block.

In an implementation, the network information of the antenna signal measured in each block can be understood as network information of the antenna signal measured at any rotation angle in each block, or can be understood as average network information of the antenna signals measured at multiple rotation angles in each block, or can be understood as maximum network information of the antenna signals measured at multiple rotation angles in each block.

The rotation angle can be understood to be a rotation angle of the millimeter-wave antenna from the initial position to the current position.

In an implementation, the absolute zero point can be set by the magnetic coding chip, and by setting the absolute zero point as the initial position, the magnetic coding chip can record the rotation angle of the millimeter-wave antenna from the initial position to the current position. Certainly, in other implementations, a rotation angle of the millimeter-wave antenna from the previous position to the current position can be recorded in an angle measurement manner.

In an implementation, the processor is further configured to determine the target block for the millimeter-wave antenna according to the multiple pieces of network information measured. The network information includes at least one of RSRP, RSRQ, a RSSI, an SNR, and a rank of an MIMO channel matrix. In an implementation, there is no further limitation on definition of the network information.

For example, a reference signal parameter is selected from at least one signal parameter of each piece of network information, and one piece of network information a value of the reference signal parameter of which is maximum is selected from the multiple pieces of network information and is taken as target network information. In an implementation of the present disclosure, the RSRP is taken as example for illustration. That is, the processor can be configured to obtain multiple RSRP values of the millimeter-wave antenna in multiple blocks, determine a maximum RSRP value among the multiple RSRP values, determine the network information the RSRP value of which is the maximum RSRP value as target network information, and determine a block corresponding to the target network information as the target block.

The processor 22 is further configured to control, in the target block, the driving module to drive the millimeter-wave antenna to rotate according to a preset rotation stepping, so as to obtain the target orientation. The processor 22 is further configured to control the millimeter-wave antenna to rotate to the target orientation.

Furthermore, the driving module 252 can drive the millimeter-wave antenna to rotate according to the preset rotation stepping, so as to obtain the target orientation. The preset rotation stepping n may be smaller than or equal to an included angle of a scan range corresponding to the target block. For example, when the included angle of the scan range corresponding to the target block is 30 degrees, the preset rotation stepping n may be 1 degree, 2 degrees, 5 degrees, 10 degrees, 15 degrees, or the like. What needs to be illustrated is that the preset rotation stepping n is determined by an antenna scan coverage range and frequency spectrum characteristics of the millimeter-wave antenna, where the wider the scan coverage range of the millimeter-wave antenna, the larger the preset rotation stepping n.

In an implementation, the processor 22 is further configured to drive, in the target block, the millimeter-wave antenna to rotate according to the preset rotation stepping to obtain network information in each rotation orientation, and determine the target orientation of the millimeter-wave antenna according to the network information obtained in each rotation orientation. For example, when the driving mechanism 252 drives the millimeter-wave antenna to rotate once according to the preset rotation stepping, the RF circuit 242 can correspondingly obtain network information of the millimeter-wave antenna in current orientation. When the included angle of the scan range corresponding to the target orientation is 60 degrees and the preset rotation stepping is 5 degrees, the driving mechanism 252 can drive the millimeter-wave antenna to make stepping rotation twelve times in the target block, obtain twelve pieces of network information in the target block, and determine the target orientation according to the twelve pieces of network information. After determining the target orientation, the millimeter-wave antenna can be rotated to the target orientation, and thus the millimeter-wave antenna can be accurately aligned with the base station.

The processor 22 in the CPE can control, according to the interval stepping strategy, the driving mechanism to drive the millimeter-wave antenna to rotate, such that in different blocks network information of a millimeter-wave signal can be measured to determine the target block for the millimeter-wave antenna. The processor 22 can further drive, in the target block, the millimeter-wave antenna to rotate according to the preset rotation stepping to obtain the target orientation, and thus by controlling rotation of one millimeter-wave antenna, an omnidirectional coverage of the scan range can be achieved, thereby reducing cost. Meanwhile, based on the interval stepping strategy, the driving mechanism is controlled to drive the millimeter-wave antenna to rotate, so as to perform interval scan on the multiple blocks to determine the target block. Mutual interference between two adjacent stepping rotations is lowest, and thus signal interference can be reduced. Furthermore, based on the target block the target orientation for 5G network access can be determined, thereby increasing an alignment accuracy between the millimeter-wave antenna and the base station and accordingly improving communication quality.

In an implementation, the processor 22 is further configured to obtain network information measured in the current block and the previous block, and update the interval stepping strategy according to the network information measured in the current block and the previous block.

For example, when the included angle of the scan range corresponding to each block is 90 degrees, there are four blocks. The blocks can be identified in the clockwise direction or counterclockwise direction, for example, the blocks can be identified as block 1, block 2, block 3, and block 4. Correspondingly, the interval stepping strategy is that the millimeter-wave antenna is controlled to make an interval stepping rotation in the sequence of block 1-block 3-block 2-block 4.

The processor 22 can be configured to obtain, from the RF circuit, network information measured in block 1 and block 3. If a value of a reference signal parameter of the network information measured in block 3 is larger than a value of a reference signal parameter of the network information measured in block 1, the target block is determined from block 2, block 3, and block 4. If the value of the reference signal parameter of the network information measured in block 1 is larger than the value of the reference signal parameter of the network information measured in block 3, the target block is determined from block 1, block 2, and block 4.

For example, when it needs to determine the target block from block 2, block 3, and block 4, the interval stepping strategy can be changed to be that rotation is made in the sequence of block 1-block 3-block 4. If a value of a reference signal parameter of network information measured in block 4 is larger than the value of the reference signal parameter of the network information measured in block 3, block 4 is determined as the target block, and at this point, the CPE 10 does not control the millimeter-wave antenna to rotate. If the value of the reference signal parameter of the network information measured in block 3 is larger than the value of the reference signal parameter of the network information measured in block 4, the millimeter-wave antenna is controlled to make a sequential stepping rotation in the sequence of block 3-block 2, and the interval stepping strategy is changed to be that rotation is made in the sequence of block 1-block 3-block 2. If the value of the reference signal parameter of the network information measured in block 3 is larger than a value of a reference signal parameter of network information measured in block 2, the block 3 is determined as the target block, and the interval stepping strategy is changed to be that rotation is made in the sequence of block 1-block 3.

The CPE 10 can control the millimeter-wave antenna to rotate according to the updated interval stepping strategy and determine the target block after searching for part of the blocks, thereby increasing a speed of determining the target block and improving an efficiency of network searching.

In an implementation, the millimeter-wave antenna includes multiple radiation units. The RF circuit 242 can control an angle in which each radiation unit radiates a wave beam according to an amplitude and a phase of an antenna signal received by each radiation unit, such that the radiation units receive antenna signals to obtain a wave beam having a certain direction angle.

In an implementation, the multiple radiation units are taken as a whole. The processor 22 can be configured to obtain, from the RF circuit, network information of the antenna signal received by each radiation unit, and calculate a value of multiple pieces of network information of the antenna signals received by the multiple radiation units in the current rotation orientation. The value of the multiple pieces of network information can be understood to be an average value or a maximum value of the multiple pieces of network information of the antenna signals received by the multiple radiation units. What needs to be illustrated is that in the implementation of the present disclosure, there is no further limitation on definition of the network information.

The processor 22 is further configured to obtain multiple network data packets of the antenna signals received by the multiple radiation units in the target block. The network data packet contains signal quality information of the antenna signals received by each radiation unit in different orientations. The processor 22 is further configured to update the preset rotation stepping according to the multiple network data packets of the antenna signals received by the multiple radiation units in the target block, and control the driving module to drive the millimeter-wave antenna to rotate according to the updated preset rotation stepping, so as to obtain the target orientation.

For example, the millimeter-wave antenna includes four radiation units. The four radiation units may be linearly arranged and locate in a same plane, or may be arranged in a 2*2 array. Position information of the four radiation units may be expressed as $P_1(x,y)$, $P_2(x,y)$, $P_3(x,y)$, and $P_4(x,y)$. At a same time point only one of the four radiation units is in a working state. When one radiation unit works, the RF circuit 242 can obtain signal quality information of antenna signals received by the radiation unit in different orientations.

In an implementation, the processor 22 can be configured to obtain the network data packets, where the network data packets can be expressed as $Q_{P1}$, $Q_{P2}$, $Q_{P3}$, and $Q_{P4}$. Meanwhile, the network data packet of each radiation unit can include spatial position information of each radiation unit and beam directive information of each radiation unit in each orientation, that is, signal quality information of a millimeter-wave antenna signal received by each radiation unit in each orientation.

The processor 22 can be configured to update the interval stepping strategy according to the multiple network data packets obtained in the target block. In an implementation, the processor 22 can be configured to determine the maximum network data packet $Q_{max}$ from the four network data packets $Q_{P1}, Q_{P2}, Q_{P3}, Q_{P4}$, and determine a target radiation unit according to the maximum network data packet $Q_{max}$. The CPE 10 can determine spatial position information of the target radiation unit and signal quality of a wave beam received by the target radiation unit in each orientation according to the target radiation unit, determine an orientation of a wave beam a value of the signal quality of which is maximum, and determine the orientation as a target tracking orientation. The processor 22 can be configured to update the preset rotation stepping by obtaining the millimeter-wave antenna signal according to the target tracking direction, and obtain the target orientation according to the updated preset rotation stepping.

What needs to be illustrated is that a correspondence between the position of the absolution zero point in the driving mechanism 252 and the position information of the four radiation units can be stored in the memory 21 in advance, and thus a correspondence between rotation angles of the driving mechanism 252 and target tracking orientations can be established.

The CPE 10 can update the preset rotation stepping according to the spatial position information of each radiation unit of the millimeter-wave antenna and the network information received by each transceiver unit, and thus rotation of the millimeter-wave antenna can be controlled, a high coupling degree can be provided, and the target orientation can be quickly determined in the target block.

In an implementation, the CPE 10 can work in a stand alone (SA) networking mode, and can also work in a non-standalone (NSA) networking mode. The 3rd generation partnership project (3GPP) defines two schemes for 5G new radio (NR) networking, namely SA networking and NSA networking. When the CPE 10 needs to perform 5G communication, the CPE 10 can connect to a cell with the ability of supporting the NSA networking or SA networking, and connect to an NR air interface according to different networking modes, so that the CPE 10 can enjoy 5G service.

When the CPE 10 works in the NSA networking mode, the processor 22 is further configured to receive a measurement command from the base station based on a first network system, where the measurement command at least contains time information configured by the base station and used for instructing the CPE 10 to measure an antenna signal supported by a second network system. The first network system is a 4G network system, and the second network system is a 5G network system. According to the measurement command, the driving mechanism 252 is controlled to drive the millimeter-wave antenna to rotate according to the interval stepping strategy.

In an implementation, the processor 22 may be configured to actively initiate a procedure of connecting to the first network system and control the CPE 10 to reside on the first network system. When the CPE 10 successfully resides on the first network system, the CPE 10 can receive the measurement command from the base station via the first network system. The measurement command at least contains the time information configured by the base station, a network access threshold for controlling residing of the CPE 10 on the second network system, and so on. The time information is indicative of a duration of that the CPE 10 measures the second network system. For example, the time information may be periodic information or aperiodic information of that the CPE 10 measures the second network system. When the CPE 10 performs two adjacent measurements, the period information is an interval between the start time of a first measurement and the start time of a second measurement, or an interval between the end time of the first measurement and the start time of the second measurement, or an interval between the end time of the first measurement and the end time of the second measurement.

The first network system and the second network system may correspond to corresponding frequency band ranges. For example, the first network system is the 4G network, and a network system corresponding to the first network system is a long term evolution (LTE) system. The second network system is the 5G network, and a network system corresponding to the second network system is the 5G NR system.

The measurement command is configured by the base station, and the base station can set different time information according to the density of the NR systems. For example, the time information may be 1 second, 5 seconds, 10 seconds, or other. For example, when the base station determines that the NR cells around the LTE cell where the CPE locates are densely deployed, and the area where the CPE 10 locates is well covered by the NR systems, the base station can set the time information of that the CPE 10 measures the second network system to be relatively long, so as to reduce the power consumption of the CPE 10. When the base station determines that the NR cells around the LTE cell where the CPE 10 locates is relatively sparse, the base station can set the time information of that the CPE 10 measures the second network system to be relatively short, so as to ensure that the CPE 10 can timely detect whether the CPE 10 is covered by the second network system.

In an implementation, when the network that the CPE 10 resides on is the first network system (4G network) and the second network system is the 5G network, the first network system (LTE system) supports the NSA function, that is, supports a combination networking of the first network system and the second network system (NR system).

In an implementation, when the processor 22 is configured to control the millimeter-wave antenna to rotate according to the measurement command and correspondingly obtain the network information measured in each block by the RF circuit, the CPE 10 can control the millimeter-wave antenna to rotate according to the time information contained in the measurement command, so as to search for NR cells. Each time the millimeter-wave antenna rotates, the network information of the antenna signal can be measured once in each block.

The processor 22 is configured to periodically perform antenna signal measurement according to the measurement command configured by the base station, which can avoid increment of power consumption of the CPE 10 caused by real-time and continuous measurement of the antenna signal.

In an implementation, when the time information received by the CPE 10 satisfies a condition of network exiting, the processor 22 is further configured to exit the first network system and reside on the first network system once more to receive the measurement command from the base station once more.

The time information may be periodic information or aperiodic information. When the time information is the aperiodic information, the condition of network exiting is met. When the time information is the periodic information and the time information is longer than a first preset duration, the condition of network exiting is met. The first preset duration may be understood as a duration of that the CPE 10 does not find the second network system according to the time information.

In an implementation, the processor 22 is further configured to transmit an adjustment request to the base station when the periodical information is longer than a second preset duration and shorter than the first preset duration, where the adjustment request is used for directing the base station to adjust the time information contained in the measurement command.

The processor 22 may also be configured to control the millimeter-wave antenna to periodically search for an antenna signal according to the time information from the base station. If the periodical information is longer than the second preset duration, an antenna signal can be found according to the periodical information, but the searching efficiency is low, and power consumption of that the CPE 10 performs searching is high. The CPE 10 can transmit the adjustment request to the base station. The base station can adjust the time information in the measurement command according to the adjustment request received. The adjustment request may also carry target time information. The base station can adjust the measurement command according to the target time information carried in the adjustment request to shorten cycle time information, so as to improve the efficiency of searching for the second network system by the CPE 10 and reducing power consumption of the CPE 10.

In an implementation, the measurement command further contains a network access threshold for connecting to the second network system. The processor 22 is further configured to determine a block as the target block when network information corresponding to the block is greater than or equal to the network access threshold.

The network access threshold meets a standard value for the CPE 10 to connect to the second network system. It should be noted that the standard value may be the lowest standard value, the highest standard value, or any one of the lowest standard value and the highest standard value.

In an implementation, during the rotation of the millimeter-wave antenna, each time the millimeter-wave antenna rotates, the network information of the antenna signal is measured once in the current block, and the obtained network information is compared with the network access threshold. If the network information meets the network access threshold, the current block is determined as the target block, and then a network access request is sent to the base station in the target block. The network access request is used to instruct the base station to transmit a network access command for connecting to the second network system to the CPE 10, such that the CPE 10 initiates network access according to the network access command, and then the CPE 10 resides on the second network system.

In an implementation, the processor 22 is configured to immediately stop controlling the rotation of the millimeter-wave antenna when the obtained network information meets the network access threshold, so that the millimeter-wave antenna stops searching for antenna signals, which can improve the efficiency of searching for antenna signals by the CPE 10, thereby increasing the speed at which the CPE 10 connects to the second network system.

In an implementation, for each block, the processor 22 is further configured to connect to the second network system when the measured network information is greater than or equal to the network access threshold, obtain beam information of an antenna signal received by the millimeter-wave antenna, exit the second network system, and determine the target block according to the beam information in at least one block.

In each block, the CPE 10 can correspondingly obtain the network information of the second network system measured via the millimeter-wave antenna, and compare the obtained network information with the network access threshold. When the network information is greater than the network access threshold, the CPE 10 determines that the network information meets the network access condition and that the CPE 10 can connect to the second network system in the block corresponding to the network information. After the CPE 10 connects to the second network system, the CPE 10 can obtain the beam information of the antenna signal received by the millimeter-wave antenna from the base station. The beam information may refer to gain information of the antenna signal received by the millimeter-wave antenna. After the CPE 10 obtains the beam information, the CPE 10 can exit the second network system. That is, the processor 22 can be configured to connect to the second network system in each block to obtain the beam information when the network information is greater than or equal to the network access threshold, and exit the second network system.

During the rotation of the millimeter-wave antenna, the processor 22 can be configured to obtain, in at least one block, beam information received by the millimeter-wave antenna. For example, the processor 22 may be configured to correspondingly obtain m pieces of beam information, where m is larger than or equal to 1. The processor 22 can be configured to select one piece of beam information with the maximum value from the m pieces of beam information, and determine the block corresponding to the piece of beam information with the maximum value as the target block. After the target block is determined, the processor 22 can be configured to control the millimeter-wave antenna to rotate to the target block, so as to provide a condition for the CPE 10 to connect to the second network system.

In this implementation, during controlling the rotation of the millimeter-wave antenna, the CPE 10 can connect to the second network system under a preset condition, correspondingly obtain the beam information received by the millimeter-wave antenna, and then determine the target block based on multiple pieces of beam information, which can improve communication quality of that the CPE 10 connects to the second network system.

In an implementation, the processor 22 is further configured to transmit omnidirectional network data to the base station. The omnidirectional network data contains network information measured in each block and carries an obtaining request, where the obtaining request is used for directing the base station to determine the target block according to the omnidirectional network data.

The omnidirectional network data at least contains network information in part of the blocks and a cell identifier of each NR cell corresponding to each block, where the network information further carries block information. That is, the omnidirectional network data may be network information in each block in an omnidirectional condition, or may be network information in part of the blocks filtered by the CPE 10 according to a threshold. After the base station receives the omnidirectional network data, the base station can know a signal layout of the second network system in the entire space according to the omnidirectional network data, and then determine a target NR cell that the CPE 10 can connect to, and perform target-block matching according to the target NR cell. For example, the base station can determine the target NR cell based on comprehensive consideration of information such as load of each NR cell. The base station can transmit the target block determined to the CPE 10.

In this implementation, the processor 22 may be configured to transmit the omnidirectional network data obtained to the base station, and the base station determines the target block in which the CPE 10 plans to connect to the second network system according to the information such as the load of each NR cell. Therefore, access resources of the NR cells can be allocated reasonably, and the efficiency of that the CPE 10 connects to the second network system can be improved.

In an implementation, the processor 22 is further configured to connect to the second network system in each rotation orientation when the millimeter-wave antenna is driven, in the target block, to rotate according to the preset rotation stepping, corresponding obtain, in each rotation orientation, beam information of an antenna signal received by the millimeter-wave antenna after the millimeter-wave antenna connects to the second network system, exit the second network system, and determine the target orientation according to the beam information in each rotation orientation.

In an implementation, in the target block, the driving mechanism 252 can drive the millimeter-wave antenna to rotate according to the preset rotation stepping, and each time the millimeter-wave antenna rotates, the millimeter-wave antenna can connect to the second network system in the current orientation based on the RF circuit 242. After the millimeter-wave antenna connects to the second network system, the RF circuit 242 can obtain the beam information of the antenna signal received from the base station by the millimeter-wave antenna. The beam information may refer to the gain information of the antenna signal received by the millimeter-wave antenna. After the CPE 10 obtains the beam information, the CPE 10 can exit the second network system. The RF circuit 242 can correspondingly obtain multiple pieces of beam information of antenna signals received by the millimeter-wave antenna from the base station in different rotation orientations in the target block, and determine an orientation corresponding to the beam information having the maximum value as the target orientation.

In an implementation, the processor 22 is further configured to connect to the second network system in the target orientation, obtain beam information of current beam connecting the millimeter-wave antenna and the base station based on the second network system, and control, according to the beam information, the millimeter-wave antenna to rotate within a preset rotation range to calibrate a direction in which the millimeter-wave antenna is aligned with the base station.

When the millimeter-wave antenna rotates to the target orientation, the millimeter-wave antenna can connect to the second network system in the target orientation. For example, the processor 22 can be configured to transmit an access request for connecting to the second network system to the base station when the millimeter-wave antenna rotates to the target orientation. The base station can transmit the network access command for connecting to the second network system to the CPE 10 according to the access request. The processor 22 can be configured to connect to the second network system according to the network access command.

The processor 22 can be configured to transmit and receive signals from the second network system via the millimeter-wave antenna when the CPE 10 connects to the second network system, and can obtain the beam information of the current beam connecting the base station and the millimeter-wave antenna. The beam information at least contains the gain information of the millimeter-wave antenna in various orientations.

The processor 22 can be configured to control the millimeter-wave antenna to rotate within the preset range according to the beam information, so as to slightly adjust the direction in which the millimeter-wave antenna is aligned with the base station. For example, the processor 22 can be configured to obtain the gain information of the millimeter-wave antenna in various orientations, for example, the gain information in the orientation β is the largest. At this point, the CPE 10 may control the millimeter-wave antenna to rotate to make a plane where the millimeter-wave antenna locates be perpendicular to the orientation β, so that the millimeter-wave antenna can be aligned with the current beam connected to the base station to realize gain maximization of the millimeter-wave antenna.

In an implementation of the present disclosure, by setting the millimeter-wave antenna that can be controlled to rotate, in various actual application scenarios, according to information such as quality of signals received by the millimeter-wave antenna, the millimeter-wave antenna is controlled to rotate, the radiation direction of the millimeter-wave antenna is automatically adjusted to be accurately aligned with the antenna beam of the base station, such that alignment efficiency and communication quality can be improved.

In an implementation, the processor 22 can be configured to obtain signal quality information of the antenna signal received by the millimeter-wave antenna. When within a preset duration a value of the signal quality information is lower than a preset quality threshold, the CPE 10 controls the millimeter-wave antenna to rotate once more according to a calibration-rotation scheme.

In an implementation, when the CPE 10 connects to the second network system, the processor 22 can be configured to obtain the signal quality information of the antenna signal received by the millimeter-wave antenna. The signal quality information may include an RSSI, an SNR, RSRP, and so on. In a case that the CPE 10 connects to the second network system, when the millimeter-wave antenna receives the wave beam from the base station connected to the millimeter-wave antenna, the signal quality of the antenna signal received by the millimeter-wave antenna changes with a change of environment where the CPE 10 locates. When within the preset duration the value of the signal quality information is lower than the preset quality threshold, the CPE 10 may disconnect from the second network system. At this point, the processor 22 can be configured to control the millimeter-wave antenna to rotate according to the calibration-rotation scheme to adjust the direction in which the millimeter-wave antenna is aligned with the base station, thereby improving communication quality of the CPE 10.

What needs to be illustrated is that the preset quality threshold and the preset duration can be set according to antenna performance parameters of the millimeter-wave antenna, frequency bands at which the millimeter-wave antenna transmits signal to and receives signal from the second network system, and so on. In the implementation of the present disclosure, there is no further limitation on definition of the preset quality threshold and the preset duration.

In an implementation, the calibration-rotation scheme includes automatic calibration based on the millimeter-wave antenna.

In an implementation, the processor can be configured to obtain an identification request from the RF circuit, where the identification request is transmitted by the base station and used for directing the CPE 10 to obtain an equipment calibration type. The processor 22 can be configured to report a type result to the base station according to the identification request, and perform, according to the calibration command transmitted by the base station, the automatic calibration on the radiation direction of the millimeter-wave antenna based on the millimeter-wave antenna.

The equipment calibration type includes automatic equipment calibration and passive equipment calibration. The automatic equipment calibration may be understood as that the CPE 10 supports automatic calibration of the radiation direction of the millimeter-wave antenna, and the passive equipment calibration may be understood as that the CPE 10 does not support the automatic calibration of the radiation direction of the millimeter-wave antenna, and other auxiliary devices are needed to realize the calibration of the radiation direction of the millimeter-wave antenna.

The calibration command is determined by the base station according to the equipment type result reported by the CPE 10. When the equipment type result is the automatic equipment calibration, the base station generates a corresponding calibration command and transmits the calibration command generated to the CPE 10.

In an implementation, the calibration-rotation scheme may be that the millimeter-wave antenna is controlled to rotate once more according to the recorded network information of the antenna signal received by the millimeter-wave antenna in each block. For example, the processor 22 can be configured to determine, according to the network information measured in each block, multiple access blocks in which the CPE 10 can connect to the second network system, determine a rotation priority of each access block according to the network information corresponding to each access block, and control the millimeter-wave antenna to rotate according to the rotation priority of each access block. For example, the multiple access blocks may be called as a first access block, a second access block, . . . , and a N$^{th}$ access block, and the rotation priorities of the first access block, the second access block, . . . , and the N$^{th}$ access block are arranged in a descending order. The CPE 10 can control the millimeter-wave antenna to rotate in a rotation sequence of the first access block, the second access block, . . . , and the N$^{th}$ access block. Each time the millimeter-wave antenna rotates, whether within the preset duration the value of the signal quality information received is lower than the preset quality threshold is determined.

Furthermore, the processor 22 can be configured to rotate the millimeter-wave antenna to the target access block according to the network information corresponding to each access block, so as to calibrate the direction in which the millimeter-wave antenna is aligned with the base station.

According to an implementation of the present disclosure, a method for antenna control is provided. The method is applied to the CPE described in any of the above implementations. The CPE includes the millimeter-wave antenna, the RF circuit, and the driving module. The millimeter-wave antenna is configured to transmit and receive an antenna signal at a millimeter-wave frequency band. The RF circuit is coupled with the millimeter-wave antenna, configured to control the millimeter-wave antenna to transmit and receive an antenna signal, and correspondingly measure network information of the antenna signal. The driving module is coupled with the millimeter-wave antenna and configured to drive the millimeter-wave antenna to rotate.

Figure 7:
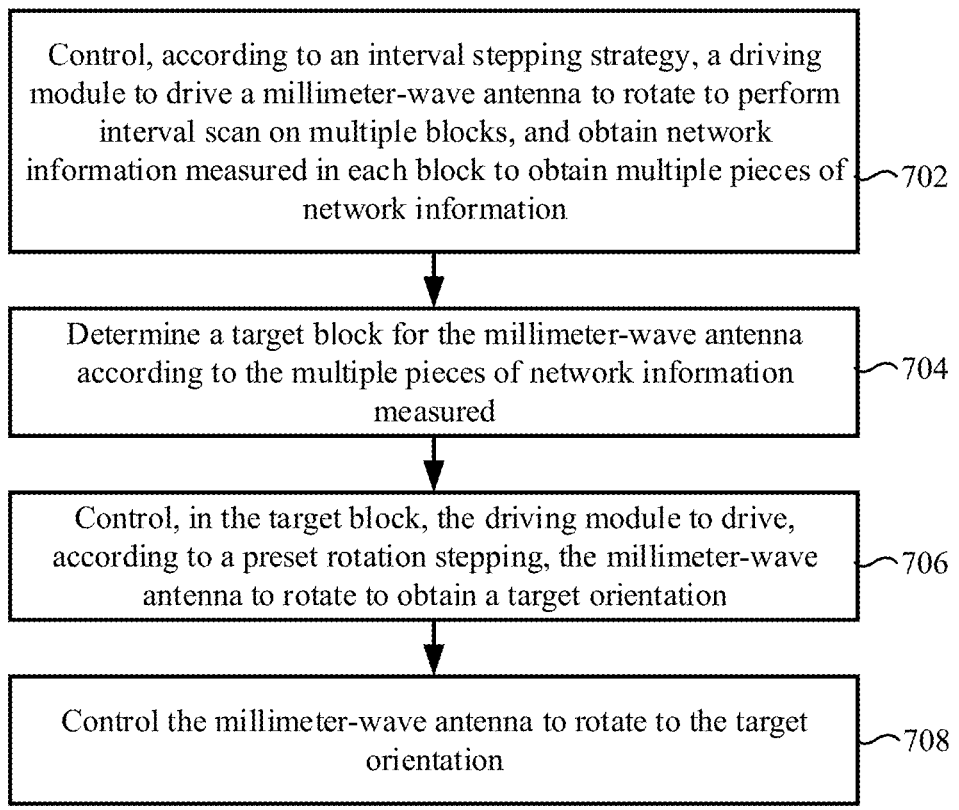
FIG. 7 is a flow chart illustrating a method for antenna control according to an implementation.

As illustrated in FIG. 7, in an implementation, a method for antenna control includes operations at 702 to 708.

At 702, control, according to an interval stepping strategy, the driving module to drive the millimeter-wave antenna to rotate to perform interval scan on multiple blocks, and obtain network information measured in each block by the RF circuit to obtain multiple pieces of network information measured.

In an implementation, a range scanned by rotation of the millimeter-wave antenna may be a 360-degree omnidirectional range in a horizontal plane. That is, the driving mechanism can drive the millimeter-wave antenna to make a 360-degree omnidirectional coverage rotation. The CPE can divide the range scanned by rotation of the millimeter-wave antenna into multiple blocks. The scan range corresponding to each block is the same, that is, an included angle A of the scan range corresponding to each block is also the same. The included angle A of the scan range corresponding to each block may be 180 degrees, 120 degrees, 90 degrees, 72 degrees, 60 degrees, 45 degrees, 30 degrees, 15 degrees, or other.

In an implementation, the interval stepping strategy may be understood as that when stepping from the current block to the next block during rotation, instead of stepping in a clockwise or counterclockwise direction, an interval stepping rotation is performed. The interval stepping rotation may be understood as a stepping rotation with one or more blocks between the current block and the previous block or a stepping rotation with one or more blocks between the current block and the next block.

In an implementation, the CPE can control, according to the interval stepping strategy constructed, the driving module to drive the millimeter-wave antenna to rotate to perform the interval scan on the multiple blocks. For example, when the interval stepping strategy is that the stepping rotation is performed in the sequence of block 1-block 3-block 5-block 2-block 4, the CPE can drive the millimeter-wave antenna to make the stepping rotation in the sequence of block 1-block 3-block 5-block 2-block 4. During rotation of the millimeter-wave antenna controlled according to the interval stepping strategy, when stepping from block 1 to block 3, go over block 2, and directly control the millimeter-wave antenna to scan the scan range corresponding to block 3.

In an implementation, during rotation of the millimeter-wave antenna, the RF circuit can measure network information of the antenna signal received by the millimeter-wave antenna in each block. The CPE can obtain, from the RF circuit, the network information of the antenna signal received by the millimeter-wave antenna in each block.

In an implementation, the network information of the antenna signal measured in each bock can be understood to be network information of the antenna signal measured at any rotation angle in each block, or average network information of antenna signals measured at various rotation angles in each block, or maximum network information of antenna signals measured at various rotation angles in each block.

At 704, a target block for the millimeter-wave antenna is determined according to the multiple pieces of network information measured.

In an implementation, the CPE determines the target block for the millimeter-wave antenna according to the multiple pieces of network information measured. For example, a reference signal parameter is selected from at least one signal parameter of each piece of network information, and one piece of network information a value of the reference signal parameter of which is maximum is selected from the multiple pieces of network information and is taken as target network information.

In an implementation of the present disclosure, the RSRP is taken as example for illustrating the network information. That is, the CPE can obtain multiple RSRP values of the millimeter-wave antenna in multiple blocks, determine a maximum RSRP value among the multiple RSRP values, determine the network information the RSRP value of which is the maximum RSRP value as the target network information, and determine a block corresponding to the target network information as the target block. After determining the target block, the millimeter-wave antenna can be rotated to the target block, such that the millimeter-wave antenna can be accurately aligned with the base station.

At 706, control, in the target block, the driving module to drive, according to a preset rotation stepping, the millimeter-wave antenna to rotate to obtain a target orientation.

At 708, control the millimeter-wave antenna to rotate to the target orientation.

Furthermore, the driving module can drive, according to the preset rotation stepping, the millimeter-wave antenna to rotate in the target block, so as to obtain the target orientation. The preset rotation stepping n may be smaller than or equal to an included angle of a scan range corresponding to the target block. In an example, when the included angle of the scan range corresponding to the target block is 30 degrees, the preset rotation stepping may be 1 degree, 2 degrees, 5 degrees, 10 degrees, 15 degrees, or the like. What needs to be illustrated is that the preset rotation stepping n is determined by an antenna scan coverage range and frequency spectrum characteristics of the millimeter-wave antenna, where the wider the scan coverage range of the millimeter-wave antenna, the larger the preset rotation stepping n.

In an implementation, in the target block the CPE can drive, according to the preset rotation stepping, the millimeter-wave antenna to rotate to obtain network information in each rotation orientation, and determine the target orientation for the millimeter-wave antenna according to the network information in each rotation orientation. For example, when the driving mechanism drives the millimeter-wave antenna to rotate once according to the preset rotation stepping, the RF circuit can correspondingly obtain network information of an antenna signal received by the millimeter-wave antenna in current orientation. When the included angle of the scan range corresponding to the target orientation is 60 degrees and the preset rotation stepping is 5 degrees, the driving mechanism can drive the millimeter-wave antenna to make stepping rotation twelve times in the target block, obtain twelve pieces of network information in the target block, and determine the target orientation according to the twelve pieces of network information. After determining the target orientation, the millimeter-wave antenna can be rotated to the target orientation, and thus the millimeter-wave antenna can be accurately aligned with the base station.

In an implementation, the CPE can control the driving mechanism to drive the millimeter-wave antenna to rotate according to the interval stepping strategy, such that in each block network information of a millimeter-wave signal can be measured to determine the target block for the millimeter-wave antenna. In the target block, the CPE can drive, according to the preset rotation stepping, the millimeter-wave antenna to rotate to obtain the target orientation, and thus by controlling rotation of one millimeter-wave antenna, an omnidirectional coverage of the scan range can be achieved, thereby reducing cost. Meanwhile, based on the interval stepping strategy, the driving mechanism is controlled to drive the millimeter-wave antenna to rotate to perform the interval scan on the multiple blocks, so as to determine the target block. Mutual interference between two adjacent stepping rotations is lowest, and thus signal interference can be reduced. Furthermore, based on the target block the target orientation for connecting to a 5G network can be determined, thereby increasing an alignment accuracy between the millimeter-wave antenna and the base station and accordingly improving communication quality.

Figure 8:
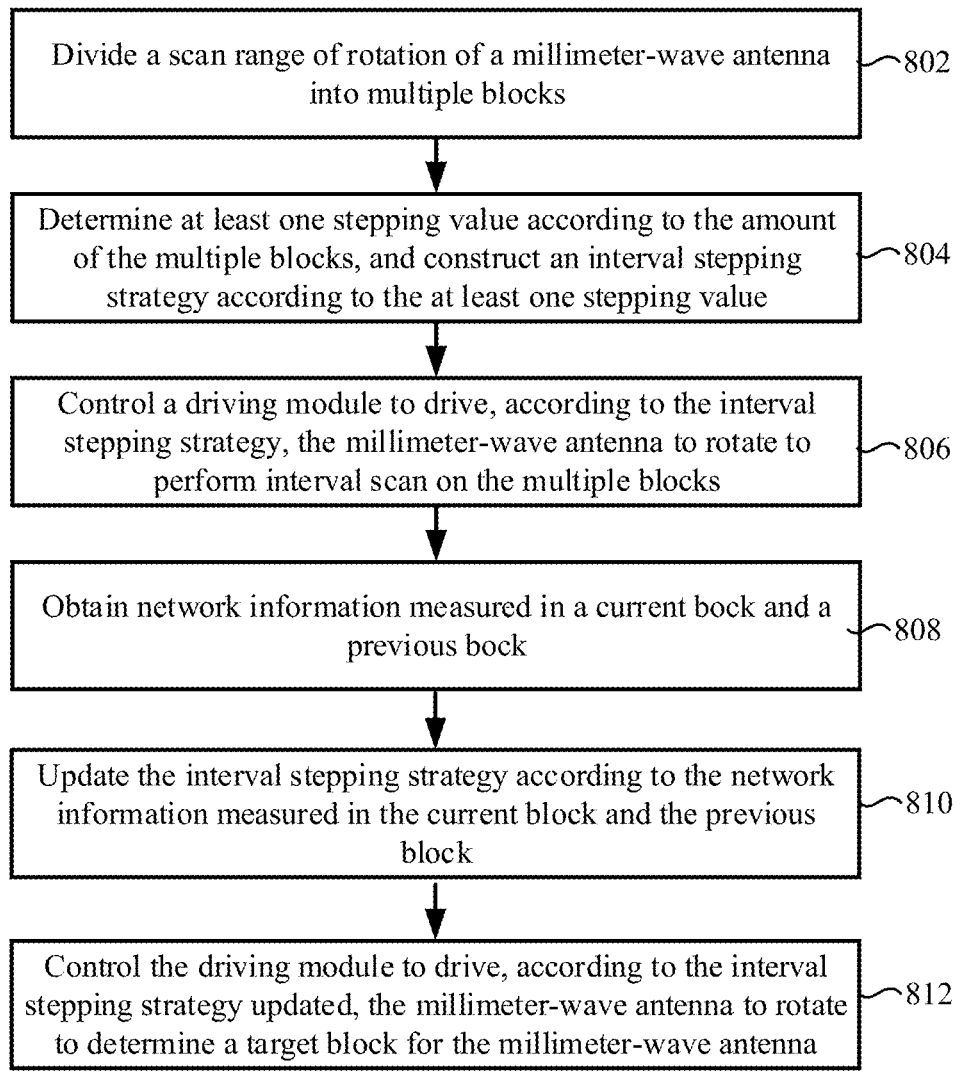
FIG. 8 is a flow chart illustrating a method for antenna control according to an implementation.

As illustrated in FIG. 8, in an implementation, a method for antenna control includes operations at 802 to block 810.

At 802, a scan range of rotation of the millimeter-wave antenna is divided into multiple blocks, where a scan range corresponding to each block is the same, and an included angle A of the scan range corresponding to each block is smaller than a preset included angle.

At block 804, determine at least one stepping value according to the amount of the multiple blocks, and construct an interval stepping strategy according to the at least one stepping value.

According to the blocks, the CPE can obtain the amount a of the blocks correspondingly, where the amount a=360/A. For example, when the included angle of the scan range corresponding to each block is 180 degrees, the amount of the blocks is 2, which means that omnidirectional coverage can be achieved by rotating twice; when the included angle of the scan range corresponding to each block is 120 degrees, the amount of the blocks is 3, which means that the omnidirectional coverage can be achieved by rotating thrice; when the included angle of the scan range corresponding to each block is 90 degrees, the amount of the blocks is 4, which means that the omnidirectional coverage can be achieved by rotating four times; when the included angle of the scan range corresponding to each block is 72 degrees, the amount of the blocks is 5, which means that the omnidirectional coverage can be achieved by rotating five times.

It should be noted that there is no limitation on the specific value of the included angle of the scan range corresponding to each block. In an implementation, the included angle of the scan range corresponding to each block is smaller than a preset included angle, where the preset included angle may be 120 degrees. That is, according to the omnidirectional coverage strategy, there are more than three blocks.

In an implementation, the included range of the scan range scanned by rotation of the millimeter-wave antenna may be Φ, where Φ<360 degrees. That is, the driving mechanism can drive the millimeter-wave antenna to rotate to perform partial-orientation scan to achieve partial-coverage rotation. In an implementation, the CPE can obtain blocks according to the scan range scanned by rotation of the millimeter-wave antenna, where the scan range A corresponding to each block is the same, that is, the included angle A of the scan range corresponding to each block is the same. According to the blocks, the amount a of the blocks can be obtained correspondingly, where a=Φ/A.

At 806, control the driving module to drive, according to the interval stepping strategy, the millimeter-wave antenna to rotate to perform interval scan on the multiple blocks.

At 808, obtain network information measured in a current bock and a previous bock.

For example, when the included angel of the scan range corresponding to each block is 90 degrees, the amount of the blocks is 4, and the blocks can be identified in a clockwise or counterclockwise direction, for example, the blocks can be identified as blocks 1, 2, 3, 4. A corresponding interval stepping strategy is that the millimeter-wave antenna is controlled to make an interval stepping rotation in the sequence of block 1-block 3-block 2-block 4.

In an implementation, the interval stepping strategy is constructed according to the multiple blocks as follows. Obtain a scan range corresponding to each block. Determine a stepping value according to the scan range corresponding to each block. Determine the interval stepping strategy according to the stepping value.

When the interval stepping strategy is that the driving mechanism is controlled to drive the millimeter-wave antenna to perform the stepping rotation in the sequence of the first block-the second block-the third block- . . . -the $a^{th}$ block, the millimeter-wave antenna does not make a sequential stepping in the clockwise or counterclockwise direction between the first block and the second block, but makes an interval rotation, that is, there is an interval between the first block and the second block. The interval between the first block and the second block is the stepping value. If the current block is the $i^{th}$ block, the previous block may be the block, and the next block may be the $i+1^{th}$ block.

For example, when the included angle of the scan range corresponding to each block is 72 degrees, the amount of the blocks is 5, and the blocks can be identified in the clockwise or counterclockwise direction, for example, the blocks can be identified as block 1, block 2, block 3, block 4, and block 5. Further, the stepping value can be determined according to the scan range corresponding to each block. The stepping value can be understood as a scan range between the current block and the previous block, where the stepping value is the scan range corresponding to at least one block. Referring to FIGS. 4a and 4b, for example, when the stepping value is the scan range corresponding to one block, the interval stepping strategy determined according to the stepping value is that the millimeter-wave antenna is controlled to make a stepping rotation in the sequence of block 1-block 3-block 5-block 2-block 4 or in the sequence of block 1-block 4-block 2-block 5-block 3.

Referring to FIGS. 5a and 5b, for example, when the included angel of the scan range corresponding to each block is 90 degrees, the amount of the blocks is 4, and the blocks can be identified in the clockwise or counterclockwise direction, for example, the blocks can be identified as blocks 1, 2, 3, 4. When the stepping value is the scan range corresponding to one block, the interval stepping strategy determined according to the stepping value is that the millimeter-wave antenna is controlled to make a stepping rotation in the sequence of block 1-block 3-block 2-block 4 or in the sequence of block 1-block 3-block 4-block 2.

Referring to FIG. 6, in an implementation, when the included angle of the scan range corresponding to each block is 45 degrees and the amount of the blocks is 8, the blocks can be identified in the clockwise or counterclockwise direction, for example, the blocks can be identified as blocks 1, 2, 3, 4, 5, 6, 7, 8. At least one stepping value can be determined according to the scan range corresponding to each block. In an implementation, there are two stepping values, where one stepping value is a scan range corresponding to two blocks, and the other stepping value is a scan range corresponding to three blocks. The interval stepping strategy determined according to the stepping values is that the millimeter-wave antenna is controlled to make a stepping rotation in the sequence of block 1-block 5-block 8-block 4-block 7-block 3-block 6-block 2.

It should be noted that block 1 can be used as an initial block, where there is no any limitation on an initial position of block 1, and the initial position of block 1 may be any position of a 360-degree circumference. According to the omnidirectional coverage strategy, the 360-degree omnidirectional orientation can be divided into a blocks, and when stepping from the $a-2^{th}$ block to the $a-1^{th}$ block or the $a^{th}$ block, only sequential stepping rotation can be performed, and thus the millimeter-wave antenna is controlled to rotate in a sequential stepping manner.

Further, the stepping value can be set according to the scan range corresponding to each block and the amount a of the blocks. When stepping from the initial block to the next block relative to the initial block, the stepping value between the initial block and the next block may be a scan range corresponding to $(a-1)/2-1$ blocks, or may be a scan range corresponding to $a/2-1$ blocks. For example, when the interval stepping strategy is that the millimeter-wave antenna is controlled to make a stepping rotation in the sequence of block 1-block 5-block 8-block 4-block 7-block 3-block 6-block 2, block 1 is the initial block, and block 5 is the next block relative to the initial block.

At 810, the interval stepping strategy is updated according to network information measured in the current block and the previous block.

In a case that the CPE controls the millimeter-wave antenna to perform the interval stepping rotation in the sequence of block 1-block 3-block 2-block 4, when stepping from block 1 to block 3, network information corresponding to block 1 and block 3 can be correspondingly obtained, and the interval stepping strategy is updated according to the network information corresponding to block 1 and block 3.

For example, if a value of a reference signal parameter of network information in block 3 is greater than that in the block 1, the target block is determined from block 2, block 3, and block 4. If the value of the reference signal parameter of network information in block 1 is greater than that in block 3, the target block is determined from block 1, block 2, and block 4.

At 812, the driving module is controlled to drive, according to the interval stepping strategy updated, the millimeter-wave antenna to rotate to determine the target block for the millimeter-wave antenna.

For example, when it needs to determine the target block from block 2, block 3, and block 4, the interval stepping strategy can be changed to be that the millimeter-wave antenna is controlled to rotate in the sequence of block 1-block 3-block 4-block 2. If a value of a reference signal parameter of network information in block 4 is greater than that in block 3, block 4 is determined as the target block. At this point, the CPE does not control the millimeter-wave antenna to rotate. If the value of the reference signal parameter of the network information in block 3 is greater than that in block 4, the millimeter-wave antenna is controlled to perform sequential stepping rotation in the sequence of block 3-block 2, and the interval stepping strategy is changed to be that the millimeter-wave antenna is controlled to rotate in the sequence of block 1-block 3-block 2. If the value of the reference signal parameter of the network information in block 3 is greater than that in block 2, block 3 is determined as the target block, and the interval stepping strategy is changed to be that the millimeter-wave antenna is controlled to rotate in the sequence of block 1-block 3.

The CPE can control the millimeter-wave antenna to rotate according to the interval stepping strategy updated and obtain the target block after performing a search operation on part of the blocks, and thus the speed of determining the target block and the efficiency of network searching are improved.

In an implementation, the millimeter-wave antenna includes multiple radiation units. The RF circuit can control an angle in which each radiation unit radiates a wave beam according to an amplitude and a phase of an antenna signal received by each radiation unit, such that the radiation units receives antenna signals to form a wave beam having a certain direction angle.

In an implementation, the multiple radiation units are taken as a whole. The RF circuit can correspondingly obtain network information of the antenna signal received by each radiation unit, and calculate a value of multiple pieces of network information of the antenna signals received by the multiple radiation units in the current rotation direction. The value of the multiple pieces of network information can be understood to be an average value or a maximum value of the multiple pieces of network information of the antenna signals received by the multiple radiation units. What needs to be illustrated is that in the implementation of the present disclosure, there is no further limitation on definition of the network information.

Figure 9:
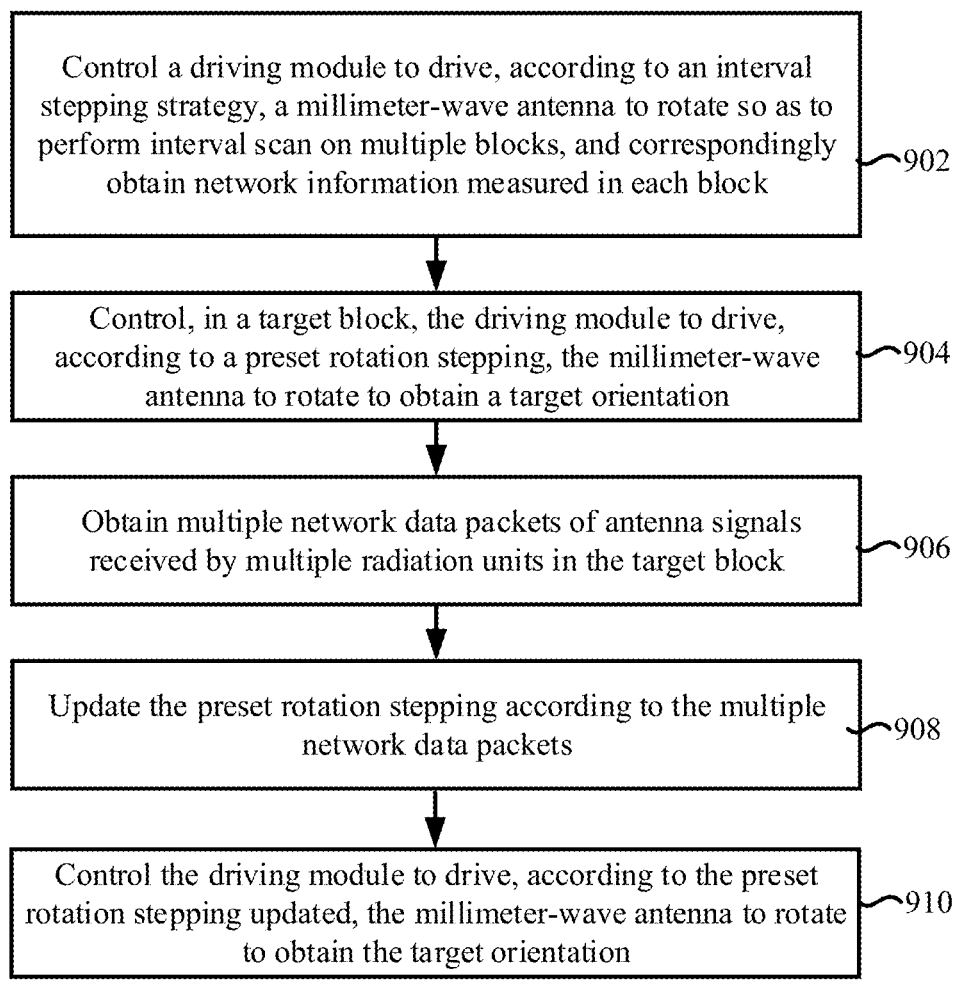
FIG. 9 is a flow chart illustrating a method for antenna control according to an implementation.

As illustrated in FIG. 9, in an implementation, a method for antenna control includes operations at 902 to 910.

At 902, the driving module is controlled to drive, according to an interval stepping strategy, the millimeter-wave antenna to rotate so as to perform interval scan on multiple blocks, and correspondingly obtain network information measured in each block by the RF circuit.

At 904, in the target block the driving module is controlled to drive, according to a preset rotation stepping, the millimeter-wave antenna to rotate to obtain a target orientation.

At 906, obtain multiple network data packets of the antenna signals received by the multiple radiation units in the target block.

For example, the millimeter-wave antenna includes four radiation units. The four radiation units may be linearly arranged and locate in a same plane, or may be arranged in a 2*2 array. Position information of the four radiation units may be expressed as $P_1(x,y)$, $P_2(x,y)$, $P_3(x,y)$, and $P_4(x,y)$. At a same time point only one of the four radiation units is in a working state. When one radiation unit works, the RF circuit can obtain signal quality information of antenna signals received by the radiation unit in different orientations.

In an implementation, the CPE can obtain the network data packets in the target block, where the network data packets can be expressed as $Q_{P1}$, $Q_{P2}$, $Q_{P3}$, a $Q_{P4}$. Meanwhile, the network data packet of each radiation unit can include spatial position information of each radiation unit and beam directive information of each radiation unit in each direction, that is, the signal quality information of the millimeter-wave antenna signal received by each radiation unit in each orientation.

At 908, the preset rotation stepping is updated according to the multiple network data packets obtained in the target block.

At 910, the driving module is controlled to drive, according to the preset rotation stepping updated, the millimeter-wave antenna to rotate to obtain the target orientation.

In an implementation, the CPE can determine a maximum network data packet $Q_{max}$ from the four network data packets $Q_{P1}$, $Q_{P2}$, $Q_{P3}$, $Q_{P4}$, and determine a target radiation unit according to the maximum network data packet $Q_{max}$. The CPE can determine spatial position information of the target radiation unit and signal quality of a wave beam received by the target radiation unit in each orientation according to the target radiation unit, determine an orientation of a wave beam a value of the signal quality of which is maximum, and determine the orientation as a target tracking orientation. The CPE can update the preset rotation stepping by obtaining the millimeter-wave antenna signal according to the target tracking direction, and obtain the target orientation according to the preset rotation stepping updated.

What needs to be illustrated is that a correspondence between a position of the absolution zero point in the driving mechanism and position information of the four radiation units can be stored in the memory in advance, and thus a correspondence between rotation angles of the driving mechanism and target tracking orientations can be established.

The CPE can update the preset rotation stepping according to the spatial position information of each radiation unit of the millimeter-wave antenna and the network information received by each transceiver unit, and thus rotation of the millimeter-wave antenna can be controlled, a high coupling degree can be provided, and the target orientation can be quickly determined in the target block.

In an implementation, the CPE can work in an NSA networking mode, and can also work in a SA networking mode. The 3GPP defines two schemes for 5G NR networking, namely SA networking and NSA networking. When the CPE needs to perform 5G communication, the CPE can connect to a cell with the ability of supporting the NSA networking or SA networking, and connect to an NR air interface according to different networking modes, so that the CPE can enjoy 5G service.

Figure 10:
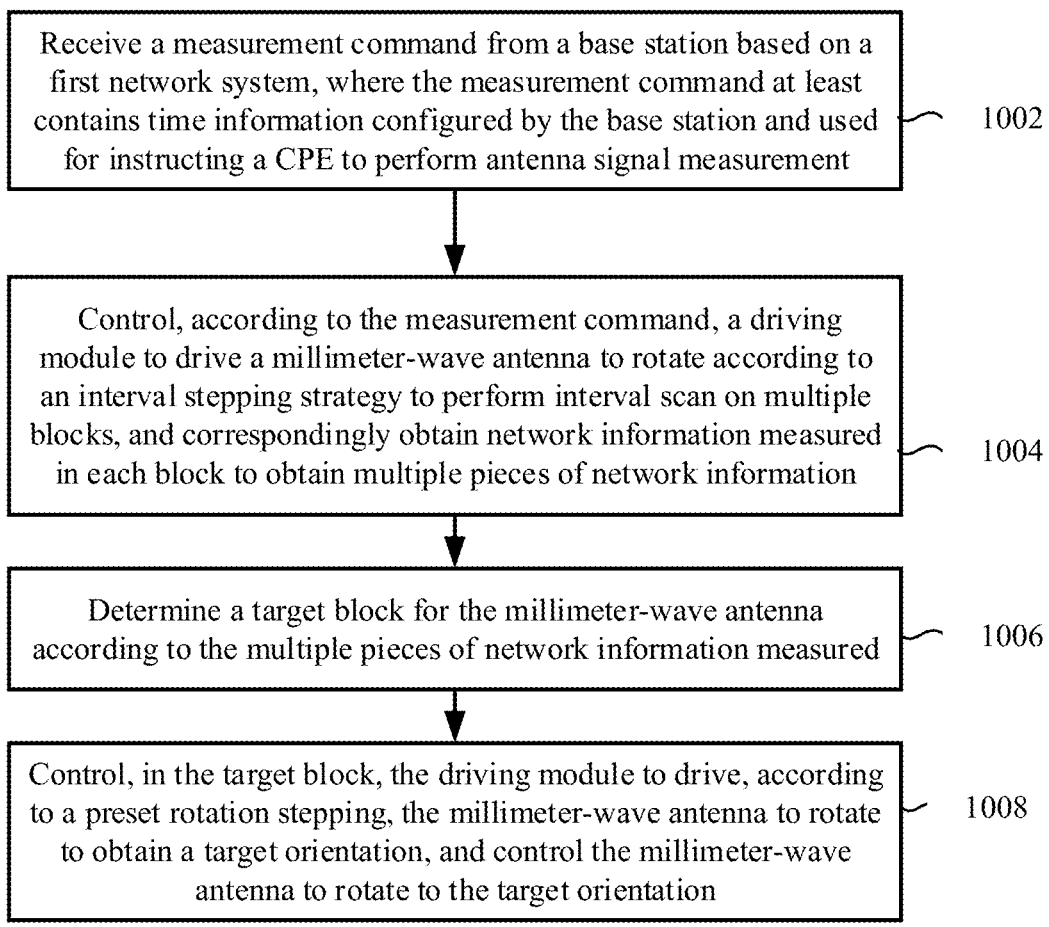
FIG. 10 is a flow chart illustrating a method for antenna control according to an implementation.

At illustrated in FIG. 10, in an implementation, when the CPE works in the NSA networking work, a method for antenna control may include operations at 1002 to 1010.

At 1002, a measurement command sent by a base station is received based on a first network system, where the measurement command at least contains time information configured by the base station and used for instructing the CPE to perform antenna signal measurement.

In an implementation, the CPE can actively initiate a procedure of connecting to the first network system and successfully reside on the first network system. When the CPE successfully resides on the first network system, the CPE can receive the measurement command from the base station via the first network system. The measurement command at least contains time information configured by the base station, a network access threshold for controlling residing of the CPE on the second network system, and so on. The time information is indicative of a duration of that the CPE measures the second network system.

The first network system and the second network system can correspond to corresponding frequency band ranges. For example, the first network system is the 4G network, and a network system corresponding to the first network system is an LTE system. The second network system is the 5G network, and a network system corresponding to the second network system is the 5G NR system.

The measurement command is configured by the base station, and the base station can set different time information according to the density of the NR systems. For example, the time information may be 1 second, 5 seconds, 10 seconds, or other. For example, when the base station determines that the NR cells around the LTE cell where the CPE locates are densely deployed, and the area where the CPE 10 locates is well covered by the NR systems, the base station can set the time information of that the CPE measures the second network system to be relatively long, so as to reduce the power consumption of the CPE. When the base station determines that the NR cells around the LTE cell where the CPE locates is relatively sparse, the base station can set the time information of that the CPE measures the second network system to be relatively short, so as to ensure that the CPE can timely detect whether the CPE is covered by the second network system.

In an implementation, when the network that the CPE 10 resides on is the first network system (4G network), and the second network system is the 5G network, the first network system (LTE system) supports the NSA function, that is, supports a combination networking of the first network system and the second network system (NR system).

At 1004, control, according to the measurement command, the driving module to drive the millimeter-wave antenna to rotate according to an interval stepping strategy to perform interval scan on multiple blocks, and correspondingly obtain network information measured in each block by the RF circuit to obtain multiple pieces of network information.

In an implementation, when the CPE controls the millimeter-wave antenna to rotate according to the measurement command and correspondingly obtain the network information measured in each block, the CPE can control the millimeter-wave antenna to rotate according to the time information contained in the measurement command to search for NR cells. Each time the millimeter-wave antenna rotates, the network information of the antenna signal can be measured once in each block.

The CPE can periodically perform antenna signal measurement according to the measurement command configured by the base station, which can avoid increment of power consumption of the CPE caused by real-time and continuous measurement of the antenna signal.

In an implementation, when the time information received by the CPE satisfies a condition of network exiting, the CPE can exit the first network system and reside on the first network system once more to receive the measurement command from the base station once more. The time information may be periodic information or aperiodic information. When the time information is the aperiodic information, the condition of network exiting is met. When the time information is the periodic information and the time information is longer than a first preset duration, the condition of network exiting is met. The first preset duration may be understood as a duration of that the CPE does not find the second network system according to the time information.

In an implementation, the CPE transmits an adjustment request to the base station when the periodical information is longer than a second preset duration and shorter than the first duration, where the adjustment request is used for directing the base station to adjust the time information contained in the measurement command. The CPE can control the millimeter-wave antenna to periodically search for an antenna signal according to the time information from the base station. If the periodical information is longer than the second preset duration, an antenna signal can be found according to the periodical information, but the searching efficiency is low, and power consumption of that the CPE performs searching is high. The CPE can transmit the adjustment request to the base station. The base station can adjust the time information contained in the measurement command according to the adjustment request received. The adjustment request may also carry target time information. The base station can adjust the measurement command according to the target time information carried in the adjustment request to shorten cycle time information, so as to improve the efficiency of searching for the second network system by the CPE and reducing power consumption of the CPE.

At 1006, a target block for the millimeter-wave antenna is determined according to the multiple pieces of network information measured.

At 1008, in the target block the driving module is controlled to drive, according to a preset rotation stepping, the millimeter-wave antenna to rotate to obtain a target orientation, and control the millimeter-wave antenna to rotate to the target orientation.

In an implementation, the measurement command further contains a network access threshold for connecting to the second network system. When any network information is greater than or equal to the network access threshold, a block is determined as the target block, where the network information corresponding to the block is greater than or equal to the network access threshold. The network access threshold meets a standard value for the CPE to connect to the second network system. It should be noted that the standard value may be the lowest standard value, the highest standard value, or any one of the lowest standard value and the highest standard value.

In an implementation, during the rotation of the millimeter-wave antenna, each time the millimeter-wave antenna rotates, the network information of the antenna signal is measured once in the current block, and the obtained network information is compared with the network access threshold. If the network information meets the network access threshold, the current block is taken as the target block, and then a network access request is sent to the base station in the target block. The network access request is used to instruct the base station to transmit a network access command for connecting to the second network system to the CPE, such that the CPE initiates network access according to the network access command, and then the CPE resides on the second network system.

In an implementation, the CPE immediately stops controlling the millimeter-wave antenna to rotate when the obtained network information meets the network access threshold, so that the millimeter-wave antenna stops searching for an antenna signal, which can improve the efficiency of searching for an antenna signal by the CPE, thereby increasing the speed at which the CPE connects to the second network system.

In an implementation, the manner of obtaining the network information measured in each block to determine the target block for the millimeter-wave antenna is as follows. Transmit omnidirectional network data to the base station. The omnidirectional network data contains network information measured in each block and carries an obtaining request, where the obtaining request is used for directing the base station to determine the target block according to the omnidirectional network data.

The omnidirectional network data at least contains network information in part of the blocks and a cell identifier of each NR cell corresponding to each block, where the network information further carries block information. That is, the omnidirectional network data may be network information in each block in an omnidirectional condition, or may be network information in part of the blocks filtered by the CPE according to a threshold. After the base station receives the omnidirectional network data, the base station can know, according to the omnidirectional network data, a signal layout of the second network system in the entire space, and then determine a target NR cell that the CPE can connect to, and perform target-block matching according to the target NR cell. For example, the base station can determine the target NR cell based on comprehensive consideration of information such as load of each NR cell. The base station can transmit the target block determined to the CPE.

In this implementation, the CPE transmits the omnidirectional network data obtained to the base station, and the base station determines the target block in which the CPE plans to connect to the second network system according to the information such as the load of each NR cell. Therefore, access resources of the NR cells can be allocated reasonably, and the efficiency of that the CPE connects to the second network system can be improved.

Figure 11:
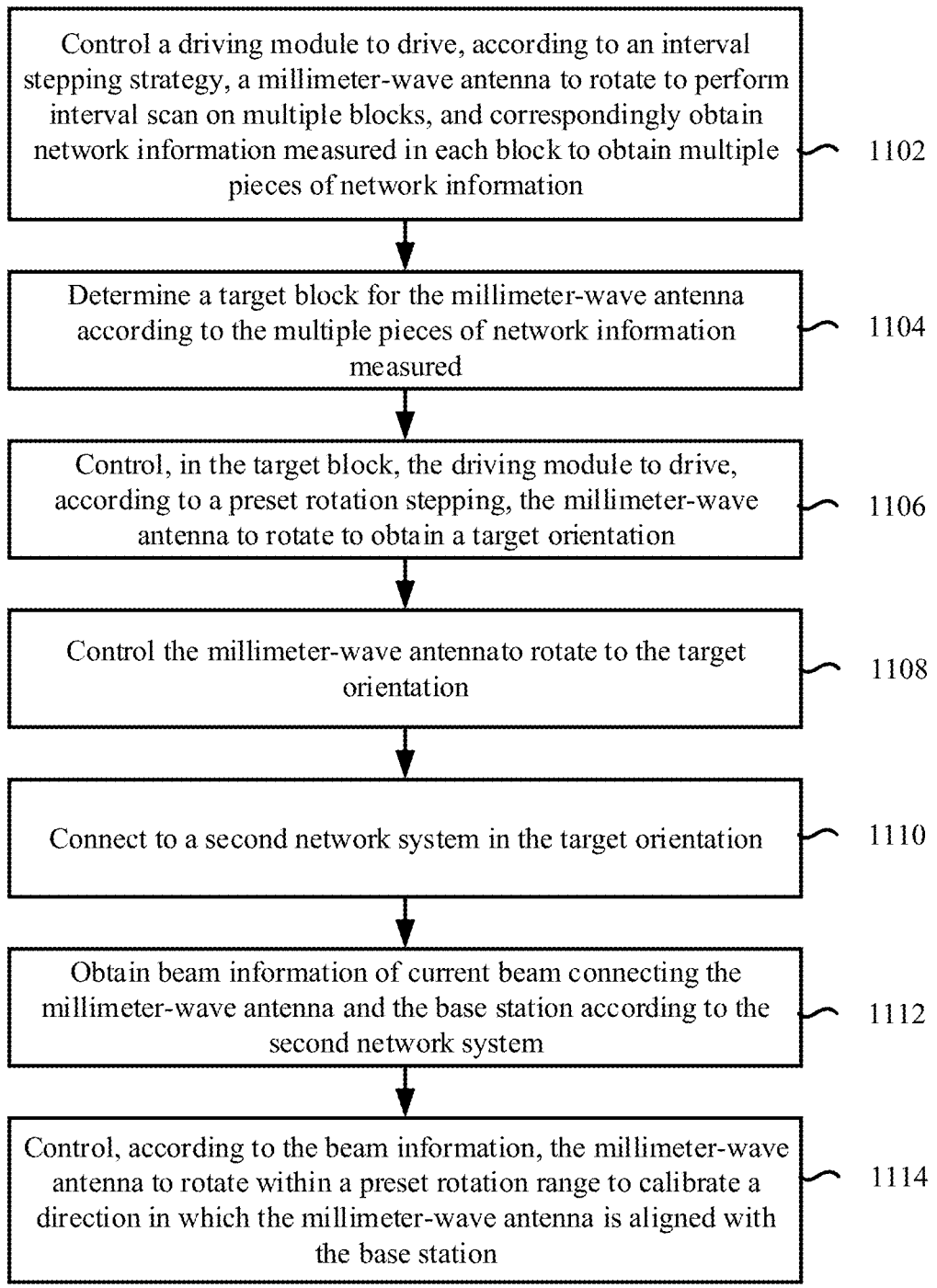
FIG. 11 is a flow chart illustrating a method for antenna control according to an implementation.

As illustrated in FIG. 11, in an implementation, a method for antenna control includes operations at 1102-1114.

At 1102, control the driving module to drive, according to an interval stepping strategy, the millimeter-wave antenna to rotate to perform interval scan on multiple blocks, and corresponding obtain network information measured in each block by the RF circuit to obtain multiple pieces of network information.

At 1104, a target block for the millimeter-wave antenna is determined according to the multiple pieces of network information measured.

At 1106, in the target block the driving module is controlled to drive, according to a preset rotation stepping, the millimeter-wave antenna to rotate to scan a target orientation.

At block 1108, the millimeter-wave antenna is controlled to rotate to the target orientation.

The operations at 1102-1108 respectively correspond to the operations at 702-708 described in the above implementation, which will not be repeated herein.

At 1110, the CPE connects to a second network system in the target orientation.

At 1112, obtain beam information of current beam connecting the millimeter-wave antenna and the base station according to the second network system.

At 1114, control, according to the beam information, the millimeter-wave antenna to rotate within a preset rotation range to calibrate a direction in which the millimeter-wave antenna is aligned with the base station.

For example, the CPE can transmit an access request for connecting to the second network system to the base station when the millimeter-wave antenna rotates to the target orientation. The base station can transmit the network access command for connecting to the second network system to the CPE according to the access request. The CPE can connect to the second network system according to the network access command.

In an implementation, the CPE transmits signals to and receives signals from the second network system through the millimeter-wave antenna when the CPE connects to the second network system, and can obtain the beam information of the current beam connecting the base station and the millimeter-wave antenna. The beam information at least contains the gain information of the millimeter-wave antenna in various orientations.

The CPE can control the millimeter-wave antenna to rotate within the preset rotation range according to the beam information, so as to slightly adjust the direction in which the millimeter-wave antenna is aligned with the base station. For example, the CPE can obtain the gain information of the millimeter-wave antenna in various orientations, for example, the gain information in the orientation β is the largest. At this point, the CPE can control the millimeter-wave antenna to rotate to make a plane where the millimeter-wave antenna locates be perpendicular to the orientation β, so that the millimeter-wave antenna can be aligned with the current beam connected to the base station to realize gain maximization of the millimeter-wave antenna.

In an implementation of the present disclosure, by setting the millimeter-wave antenna that can be controlled to rotate, in various actual application scenarios, according to information such as quality of signals received by the millimeter-wave antenna, the millimeter-wave antenna is controlled to rotate, the radiation direction of the millimeter-wave antenna is automatically adjusted to be accurately aligned with the antenna beam from the base station, such that the alignment efficiency and communication quality can be improved.

Figure 12:
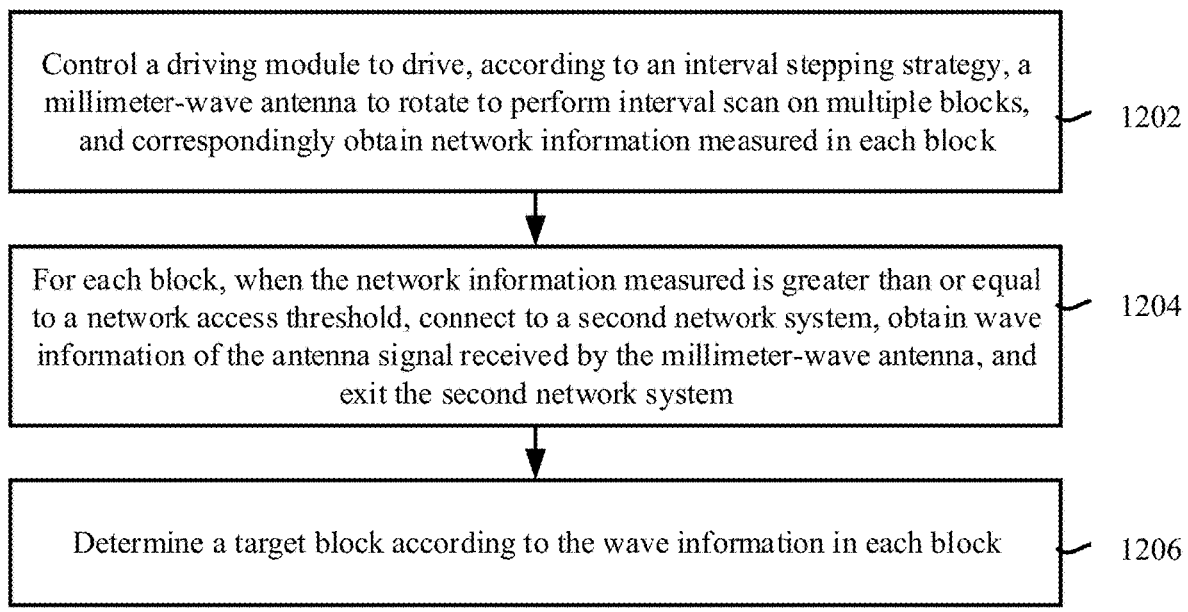
FIG. 12 is a flow chart illustrating a method for antenna control according to an implementation.

As illustrated in FIG. 12, in an implementation, a method for antenna control may include operations at 1202-block 1206.

At 1202, control the driving module to drive, according to an interval stepping strategy, the millimeter-wave antenna to rotate to perform interval scan on multiple blocks, and corresponding obtain network information measured in each block by the RF circuit.

At 1204, for each block, when the network information measured is greater than or equal to a network access threshold, the CPE connects to a second network system, obtains wave information of the antenna signal received by the millimeter-wave antenna, and exits the second network system.

At 1206, a target block is determined according to the wave information in each block.

In an implementation, in each block, the CPE can corresponding obtain network information of a second network system measured via the millimeter-wave antenna and compare the obtained network information with a network access threshold. When the network information is greater than the network access threshold, the CPE determines that the network information satisfies a network access condition and connects to the second network system in a block corresponding to the network information.

When the CPE connects to the second network system, the CPE can obtain wave information of an antenna signal received from the base station by the millimeter-wave antenna. The wave information may refer to gain information of the antenna signal received by the millimeter-wave antenna and so on. When the CPE obtains the wave information, the CPE can exit the second network system. That is, in each block when the network information is greater than or equal to the network access threshold, the CPE can connect to the second network system to obtain the wave information and exit the second network system.

During rotation of the millimeter-wave antenna, the CPE can obtain wave information received by the millimeter-wave antenna in at least one block. For example, the CPE can correspondingly obtain m pieces of wave information, select one piece of wave information with a maximum value from the m pieces of wave information, and determine a block corresponding to the piece of wave information with the maximum value as the target block, where m is larger than or equal to 1.

In an implementation, during controlling rotation of the millimeter-wave antenna, the CPE can connect to the second network system under a preset condition, correspondingly obtain the wave information received by the millimeter-wave antenna, and determine the target block according to multiple pieces of wave information, which can improve communication quality of that the CPE connects to the second network system.

Figure 13:
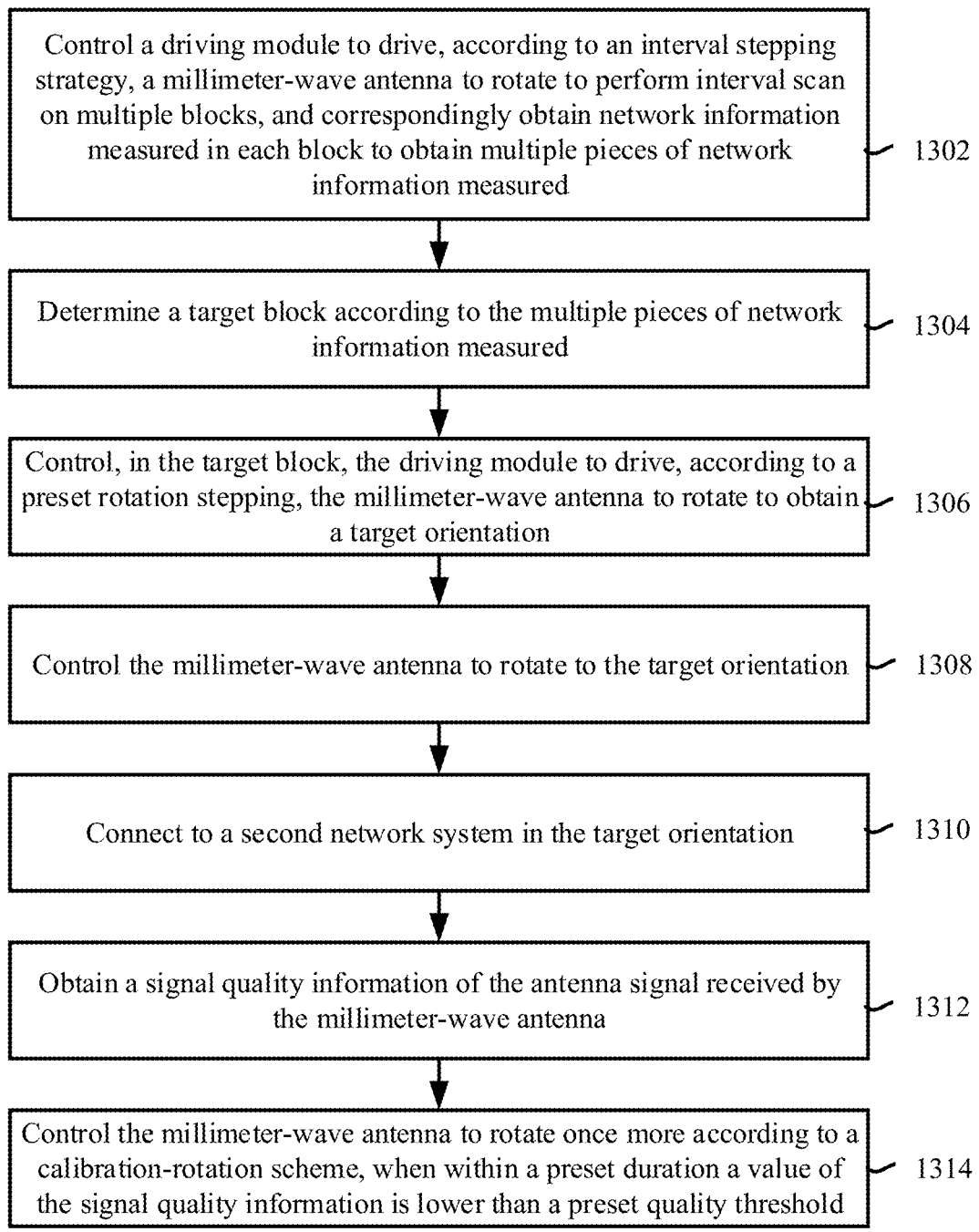
FIG. 13 is a flow chart illustrating a method for antenna control according to an implementation.

As illustrated in FIG. 13, in an implementation, a method for antenna control may include operations at 1302-1314.

At 1302, control the driving module to drive, according to an interval stepping strategy, the millimeter-wave antenna to rotate to perform interval scan on multiple blocks, and correspondingly obtain network information measured in each block by the RF circuit to obtain multiple pieces of network information measured.

At 1304, a target block is determined according to the multiple pieces of network information measured.

At 1306, in the target block the driving module is controlled to drive, according to a preset rotation stepping, the millimeter-wave antenna to rotate to obtain a target orientation.

At 1308, the millimeter-wave antenna is controlled to rotate to the target orientation.

At 1310, the CPE connects to a second network system in the target orientation.

At 1312, a signal quality information of the antenna signal received by the millimeter-wave antenna is obtained.

At 1314, when within a preset duration a value of the signal quality information is lower than a preset quality threshold, the CPE controls the millimeter-wave antenna to rotate once more according to a calibration-rotation scheme.

When the CPE connects to the second network system, the CPE can correspondingly obtain the signal quality information of the antenna signal received by the millimeter-wave antenna. The signal quality information may include an RSSI, a SNR, RSRP, and so on. In a case that the CPE connects to the second network system, when the millimeter-wave antenna receives the wave beam from the base station connected to the millimeter-wave antenna, the signal quality of the antenna signal received by the millimeter-wave antenna changes with a change of environment where the CPE locates. When within the preset duration the value of the signal quality information is lower than the preset quality threshold, the CPE may disconnect from the second network system. At this point, the CPE can control the millimeter-wave antenna to rotate according to the calibration-rotation scheme to adjust the direction in which the millimeter-wave antenna is aligned with the base station, thereby improving communication quality of the CPE.

What needs to be illustrated is that the preset quality threshold and the preset duration can be set according to information such as antenna performance parameters of the millimeter-wave antenna and frequency bands at which the millimeter-wave antenna transmits signal to and receives signal from the second network system. In the implementation of the present disclosure, there is no limitation on definition of the preset quality threshold and the preset duration.

In an implementation, the calibration-rotation scheme may be that the millimeter-wave antenna is controlled to rotate once more according to the recorded network information of the millimeter-wave antenna in each block.

For example, the CPE can determine, according to the network information measured in each block, multiple access blocks in which the CPE can connect to the second network system, determine a rotation priority of each access block according to the network information corresponding to each access block, and control the millimeter-wave antenna to rotate according to the rotation priority of each access block. For example, the multiple access blocks may be called as a first access block, a second access block, . . . , and a $N^{th}$ access block, and the rotation priorities of the first access block, the second access block, . . . , and the $N^{th}$ access block are arranged in a descending order. The CPE can control the millimeter-wave antenna to rotate in a rotation sequence of the first access block, the second access block, . . . , and the $N^{th}$ access block. Each time the millimeter-wave antenna rotates, whether within the preset duration the value of the signal quality information of the antenna signal received is lower than the preset quality threshold is determined.

Furthermore, the CPE can rotate the millimeter-wave antenna to the target access block according to the network information corresponding to each access block, so as to calibrate the direction in which the millimeter-wave antenna is aligned with the base station.

It should be understood that although various steps in the flowcharts illustrated in FIGS. 7-13 are displayed in sequence as indicated by the arrows, these steps are not necessarily executed in the order indicated by the arrows. Unless specifically stated in this specification, the execution of these steps is not strictly limited in order, and these steps can be executed in other orders. Moreover, at least part of the steps in FIGS. 7-13 may include multiple sub-steps or multiple stages. These sub-steps or stages are not necessarily executed at the same time, but can be executed at different times. These sub-steps or stages are not necessarily performed sequentially, but may be performed alternately with other steps or at least part of sub-steps or stages of other steps.

In an implementation of the present disclosure, a CPE is further provided. The CPE includes a memory and a processor. A computer program is stored in the memory. When the computer program is executed by a processor, the processor is enabled to perform the operations of the method for antenna control described in any of the above implementations.

In an implementation of the present disclosure, a computer-readable storage medium is further provided. The computer-readable storage medium may be one or more non-volatile computer-readable storage mediums that contain computer-executable instructions. When the computer-executable instructions are executed by one or more processors, the one or more processors are enabled to execute the operations of the method for antenna control.

A computer program product containing instructions is provided. When the instructions are run in a computer, the computer is enabled to execute the operations of the method for antenna control.

Any reference to memory, storage, database or other medium used in this implementation may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM) which acts as an external cache memory. As an illustration rather than a limitation, the RAM is available in many forms, such as a static RAM (SRAM), a dynamic RAM (DRAM), a synchronous DRAM (SDRAM), a double data rate SDRAM (DDR SDRAM), an enhanced SDRAM (ESDRAM), a synchronous Link (Synchlink) DRAM (SLDRAM), a memory bus (Rambus) direct RAM (RDRAM), a direct memory bus dynamic RAM (DRDRAM), and a memory bus dynamic RAM (RDRAM).

The above implementations are merely some implementations of the present disclosure, and the description of the above implementations is relatively specific and detailed, but it should not be understood as a limitation to the protection scope of the present disclosure. It should be pointed out that for those of ordinary skill in the art, without departing from the concept of this disclosure, several modifications and improvements can be made, and these modifications and improvements all fall within the protection scope of this disclosure. Therefore, the protection scope of this disclosure shall be subject to the appended claims.

What is claimed is:

1. A customer premise equipment (CPE), comprising:
a millimeter-wave antenna configured to receive and transmit an antenna signal at a millimeter-wave frequency band;
a radio frequency (RF) circuit coupled with the millimeter-wave antenna, configured to control the millimeter-wave antenna to receive and transmit the antenna signal, and measure network information of the antenna signal;
a driving module coupled with the millimeter-wave antenna and configured to drive the millimeter-wave antenna to rotate; and
a processor in communication with the RF circuit and the driving module and configured to:
control the driving module to drive, according to an interval stepping strategy, the millimeter-wave antenna to rotate to perform interval scan on a plurality of blocks, and correspondingly obtain network information measured in each of the plurality of blocks by the RF circuit to obtain multiple pieces of network information measured, wherein the plurality of blocks are determined according to a scan range of the millimeter-wave antenna, and the interval stepping strategy is that an interval stepping rotation is performed when stepping from a current block to a next block, wherein the interval stepping rotation is a stepping rotation with one or more blocks between the current block and a previous block or a stepping rotation with one or more blocks between the current block and the next block;
determine a target block for the millimeter-wave antenna according to the multiple pieces of network information measured;
control, in the target block, the driving module to drive, according to a preset rotation stepping, the millimeter-wave antenna to rotate to obtain a target orientation; and
control the millimeter-wave antenna to rotate to the target orientation.

2. The CPE of claim 1, wherein:
the millimeter-wave antenna comprises a plurality of radiation units; and
the processor is further configured to:
obtain a network data packet of an antenna signal received by each of the plurality of radiation units in the target block to obtain a plurality of network data packets, wherein each of the plurality of network data packets comprises network information of the antenna signal received by each of the plurality of radiation units in each of different orientations;
update the preset rotation stepping according to the plurality of network data packets; and
control the driving module to drive, according to the preset rotation stepping updated, the millimeter-wave antenna to rotate to the target orientation.

3. The CPE of claim 1, wherein the processor is further configured to:
divide the scan range of rotation of the millimeter-wave antenna into the plurality of blocks, wherein the scan range corresponding to each of the plurality of blocks is the same, and an included angle of the scan range corresponding to each of the plurality of blocks is smaller than a preset included angle;
determine at least one stepping value according to an amount of the plurality of blocks, wherein each of the at least one stepping value is indicative of a scan range between the current block and the previous block; and
determine the interval stepping strategy according to the at least one stepping value.

4. The CPE of claim 3, wherein the processor is further configured to set that each of the at least one stepping value comprises a scan range corresponding to at least one of the plurality of blocks.

5. The CPE of claim 3, wherein the processor is further configured to set that at least two of stepping values in the interval stepping strategy are equal or all the stepping values in the interval stepping strategy are different from each other.

6. The CPE of claim 3, wherein the processor is further configured to:
obtain network information measured in the current block by the RF circuit and network information measured in the previous block by the RF circuit; and
update the interval stepping strategy according to the network information measured in the current block and the network information measured in the previous block.

7. The CPE of claim 1, wherein:
the CPE works in a non-standalone (NSA) networking mode; and
the processor is further configured to:
receive a measurement command from a base station based on a first network system, wherein the measurement command at least comprises time information configured by the base station and indicative of a duration of that the CPE performs antenna signal measurement, and the first network system is a fourth generation (4G) network system; and
control, according to the measurement command, the driving module to drive the millimeter-wave antenna to rotate according to the interval stepping strategy, so as to perform the interval scan on the plurality of blocks.

8. The CPE of claim 7, wherein:
the measurement command further comprises a network access threshold for connecting to a second network system, wherein the second network system is a fifth generation (5G) network system; and
the processor is further configured to determine, when one of the multiple pieces of network information is greater than or equal to the network access threshold, one of the plurality of blocks corresponding to the one of the multiple pieces of network information as the target block.

9. The CPE of claim 7, wherein:
the measurement command further contains a network access threshold for connecting to a second network system;
for each of the plurality of blocks, the processor is further configured to connect to the second network system to obtain beam information of the antenna signal received by the millimeter-wave antenna when the network information measured in the block is greater than or equal to the network access threshold, and exit the second network system; and
determine the target block according to the beam information in each of the plurality of blocks.

10. The CPE of claim 9, wherein the processor is further configured to:
- connect to the second network system in each rotation orientation in the target block when the millimeter-wave antenna is driven to rotate according to the preset rotation stepping;
- obtain, in each rotation orientation, beam information of an antenna signal received after the millimeter-wave antenna connects to the second network system, and exit the second network system; and
- determine the target orientation according to the beam information in each rotation orientation.

11. The CPE of claim 1, wherein the processor is further configured to:
- determine the target block for the millimeter-wave antenna according to the network information measured in each of the plurality of blocks, or
- transmit an omnidirectional network data to a base station, wherein the omnidirectional network data comprises the network information measured in each of the plurality of blocks and carries an obtaining request, wherein the obtaining request is used for directing the base station to determine the target block according to the omnidirectional network data.

12. The CPE of claim 1, wherein the processor is further configured to:
- drive, in the target block, the millimeter-wave antenna to rotate according to the preset rotation stepping to correspondingly obtain network information in each rotation orientation; and
- determine the target orientation for the millimeter-wave antenna according to the obtained network information in each rotation orientation.

13. The CPE of claim 1, wherein the processor is further configured to:
- connect to a network system in the target orientation, wherein the network system is a fifth generation (5G) system;
- obtain beam information of a current beam connecting the millimeter-wave antenna and a base station based on the network system; and
- control the millimeter-wave antenna to rotate in a preset rotation range according to the beam information, so as to calibrate a direction in which the millimeter-wave antenna is aligned with the base station.

14. The CPE of claim 13, wherein the processor is further configured to:
- obtain quality information of the antenna signal received by the millimeter-wave antenna; and
- control the millimeter-wave antenna to rotate according to a calibration-rotation scheme when within a preset duration a value of the quality information is lower than a preset quality threshold.

15. A method for antenna control applied to a customer premise equipment (CPE), the CPE comprising a millimeter-wave antenna, a radio frequency (RF) circuit, and a driving module, the millimeter-wave antenna being configured to transmit and receive an antenna signal at a millimeter-wave frequency band, the RF circuit being coupled with the millimeter-wave antenna, configured to drive the millimeter-wave antenna to transmit and receive the antenna signal, and measure network information of the antenna signal, and the driving module being coupled with the millimeter-wave antenna and configured to drive the millimeter-wave antenna to rotate, the method comprising:
- controlling the driving module to drive, according to an interval stepping strategy, the millimeter-wave antenna to rotate to perform interval scan on a plurality of blocks, and obtaining network information measured in each of the plurality of blocks by the RF circuit to obtain multiple pieces of network information measured, wherein the plurality of blocks are determined according to a scan range of the millimeter-wave antenna, and the interval stepping strategy is that an interval stepping rotation is performed when stepping from a current block to a next block, wherein the interval stepping rotation is a stepping rotation with one or more blocks between the current block and a previous block or a stepping rotation with one or more blocks between the current block and the next block;
- determining a target block for the millimeter-wave antenna according to the multiple pieces of network information measured;
- controlling, in the target block, the driving module to drive, according to a preset rotation stepping, the millimeter-wave antenna to rotate to obtain a target orientation; and
- controlling the millimeter-wave antenna to rotate to the target orientation.

16. The method of claim 15, wherein the millimeter-wave antenna comprises a plurality of radiation units, and the method further comprises:
- obtaining a network data packet of an antenna signal received by each of the plurality of radiation units in the target block to obtain a plurality of network data packets, wherein each of plurality of network data packets comprises network information of the antenna signal received by each of the plurality of radiation units in each of different orientations;
- updating the preset rotation stepping according to the plurality of network data packets; and
- controlling the driving module to drive the millimeter-wave antenna to the target orientation according to the preset rotation stepping updated.

17. The method of claim 15, wherein the millimeter-wave antenna comprises a plurality of radiation units, and the method further comprises:
- dividing the scan range of rotation of the millimeter-wave antenna into the plurality of blocks, wherein the scan range corresponding to each of the plurality of blocks is the same, and an included angel of the scan range corresponding to each of the plurality of blocks is smaller than a preset included angle;
- determining at least one stepping value according to the amount of the plurality of blocks, wherein each of the at least one stepping value is indicative of a scan range between the current block and the previous block; and
- determining the interval stepping strategy according to the at least one stepping value.

18. The method of claim 17, wherein at least two of stepping values in the interval stepping strategy are the same, or all the stepping values in the interval stepping strategy are different from each other.

19. The method of claim 17, further comprising:
- obtain network information measured in the current block and network information measured in the previous block; and
- update the interval stepping strategy according to the network information measured in the current block and the network information measured in the previous block.

20. A customer premise equipment (CPE) comprising:
a processor; and a memory storing computer programs, wherein the computer programs, when executed by the processor, are operable with the processor to:
  control a driving module of the CPE to drive, according to an interval stepping strategy, a millimeter-wave antenna of the CPE to rotate to perform interval scan on a plurality of blocks, and correspondingly obtain network information measured in each of the plurality of blocks by a radio frequency (RF) circuit to obtain multiple pieces of network information measured, wherein the plurality of blocks are determined according to a scan range of the millimeter-wave antenna, and the interval stepping strategy is that an interval stepping rotation is performed when stepping from a current block to a next block, wherein the interval stepping rotation is a stepping rotation with one or more blocks between the current block and a previous block or a stepping rotation with one or more blocks between the current block and the next block;
  determine a target block for the millimeter-wave antenna according to the multiple pieces of network information measured;
  control, in the target block, the driving module to drive, according to a preset rotation stepping, the millimeter-wave antenna to rotate to obtain a target orientation; and
  control the millimeter-wave antenna to rotate to the target orientation.

* * * * *